US010365404B2

(12) United States Patent
Collins

(10) Patent No.: US 10,365,404 B2
(45) Date of Patent: Jul. 30, 2019

(54) DETERMINING TERRAIN MODEL ERROR

(71) Applicant: Caterpillar of Australia Pty. Ltd., Tullamarine, Victoria (AU)

(72) Inventor: Darryl V. Collins, Jindalee (AU)

(73) Assignee: Caterpillar of Australia Pty. Ltd., Victoria (AU)

( * ) Notice: Subject to any disclaimer, the term of this patent is extended or adjusted under 35 U.S.C. 154(b) by 507 days.

(21) Appl. No.: 14/966,584

(22) Filed: Dec. 11, 2015

(65) Prior Publication Data

US 2016/0170090 A1 Jun. 16, 2016

(30) Foreign Application Priority Data

Dec. 12, 2014 (AU) .................................. 2014274647

(51) Int. Cl.
*G01V 99/00* (2009.01)
*G01C 15/00* (2006.01)
*G01S 17/89* (2006.01)
*G01S 7/00* (2006.01)
*G01S 7/48* (2006.01)
*G01C 7/02* (2006.01)
*G01S 19/14* (2010.01)

(52) U.S. Cl.
CPC ............. *G01V 99/005* (2013.01); *G01C 7/02* (2013.01); *G01C 15/00* (2013.01); *G01S 7/003* (2013.01); *G01S 7/4808* (2013.01); *G01S 17/89* (2013.01); *G01V 99/00* (2013.01); *G01S 19/14* (2013.01)

(58) Field of Classification Search
CPC .............................. G01V 99/005; G01C 7/02
USPC ............................................................ 702/5
See application file for complete search history.

(56) References Cited

U.S. PATENT DOCUMENTS

| 8,019,736 B1 * | 9/2011 | Postnikov | ............... G06T 17/05 345/428 |
| 8,364,405 B2 * | 1/2013 | Sprock | .................... G06T 17/00 345/419 |
| 2009/0202109 A1 * | 8/2009 | Clar | ....................... G01C 15/00 382/104 |
| 2012/0330550 A1 * | 12/2012 | Jensen | ................... G09B 25/06 702/5 |

FOREIGN PATENT DOCUMENTS

AU 2010241349 7/2011

\* cited by examiner

*Primary Examiner* — Ricky Ngon
(74) *Attorney, Agent, or Firm* — Miller, Matthias & Hull

(57) ABSTRACT

Described herein is a method of determining a terrain of a mine worksite. The method may include determining positions of a surface of the worksite from measurements relating to the worksite's terrain. The method may also include determining errors corresponding to the determined positions. The method may also include generating a terrain model that maps the positions and the errors corresponding the positions.

16 Claims, 7 Drawing Sheets

DETERMINING TERRAIN MODEL ERROR

CROSS-REFERENCE TO RELATED APPLICATION

This application claims priority under 35 USC § 119 and the Paris Convention to Australian Patent Application No. 2014274647 filed on Dec. 12, 2014.

TECHNICAL FIELD

The present invention relates to systems and methods for modelling worksite terrain. The invention is particularity suitable for modelling the terrain of an open-cut mine worksite, and will be described in relation to that exemplary but non-limiting application.

BACKGROUND

For many types of worksites a model of the worksite terrain is a valuable tool. Terrain models are typically represented by terrain datasets which store information regarding the terrain. Terrain datasets can be processed by computer processing systems to present visualisations of the terrain in question and for various worksite-related tasks. For example, a worksite terrain model may be used to plan paths to be traversed by people and/or machines operating on the worksite.

The more accurate a worksite terrain model is, the more useful it is.

Generating and maintaining an up-to-date terrain model of a worksite, however, is challenging. This is particularly the case in worksites that cover large areas and which have terrain which changes significantly over time.

Such challenges are present, for example, in open-cut mine worksites. Open-cut mine worksites can be very large—the Fimiston Open Pit mine in Australia being approximately 3.5 km long×1.5 km wide by 570 m deep. Typically, the terrain of open-cut mine worksites is also highly changeable, with the majority of worksite operations altering the terrain—e.g. blasting, excavating, loading, grading, hauling material and the like.

SUMMARY

Described herein is a method of determining a mine worksite's terrain. The method may include determining positions of a surface of the worksite from measurements relating to the worksite's terrain. The method may also include determining errors corresponding to the determined positions. The method may also include generating a terrain model that maps the positions and the errors corresponding the positions.

also described herein is a system for determining a mine worksite's terrain. The may include system includes at least one processing device. The system may also include at least one memory for storing instructions to be executed by the at least one processing device. Upon executing the instructions the at least one processing device may be configured to determine positions of a surface of the worksite from measurements relating to the worksite's terrain. The at least one processing device may also be configured to determine errors corresponding to the determined positions. The at least one processing device may also be configured to generate a terrain model that maps the positions and the errors corresponding the positions.

Also described herein is another method of determining a mine worksite's terrain. The method may including determining positions of a surface of the worksite from measurements relating to the worksite's terrain. The determined positions may be derived from measurements from a plurality of sources. The plurality of sources may be associated with a plurality of worksite machines. Each machine may be associated with at least one of said sources. The method may further include estimating errors corresponding to the determined positions. Each estimated error may be dependent on the plurality of sources from which the corresponding position was determined. Each estimated error may be determined by weighting errors associated with the plurality of sources from which corresponding position was determined. The method may further include generating a terrain model that maps the positions and the errors corresponding the positions.

As used herein, the term "comprises" (and grammatical variants thereof) is used inclusively and does not exclude the existence of additional features, elements or steps.

BRIEF DESCRIPTION OF THE DRAWINGS

Various aspects and features will be described with reference to the following figures which are provided for the purposes of illustration and by way of non-limiting example only.

Where possible, the same reference numbers are used throughout the drawings to indicate the same or similar features.

DETAILED DESCRIPTION

Worksite Environment

Figure 1:
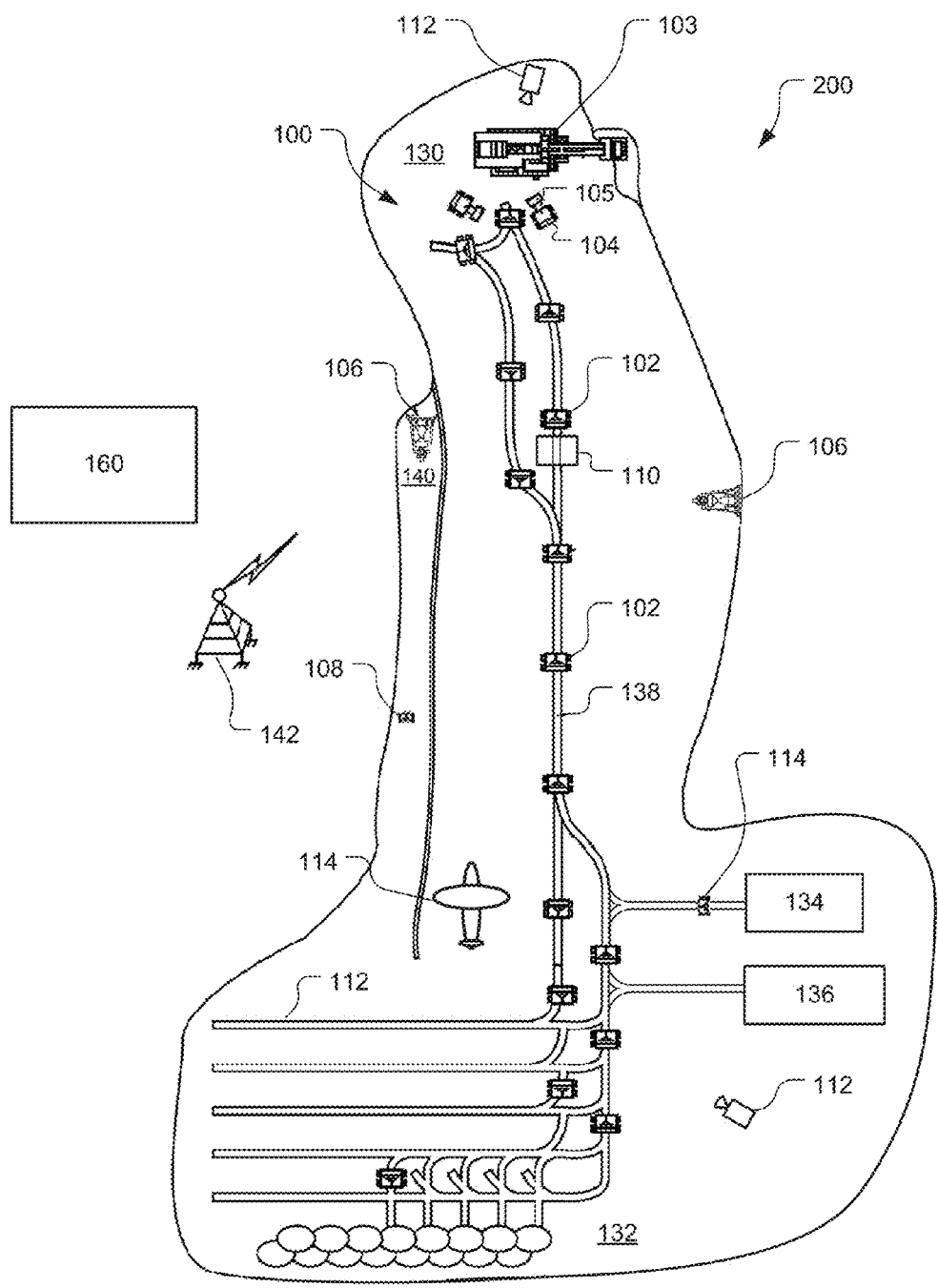
FIG. 1 is a pictorial illustration of an example worksite and control centre.

FIG. 1 illustrates a worksite 100 which, in the present example, is a mine worksite.

A variety of machines operate on or at the worksite 100. In the mine worksite environment such machines may comprise, for example: haulage machines 102 (e.g. rigid or articulated dump trucks) which operate to haul material around the worksite 100); shovels 103 (e.g. such drag lines, electric rope shovel excavators, hydraulic shovel excavators) having a bucket for digging material out of the ground; loading machines 104 (e.g. as wheel loaders, tracked loaders, backhoe loaders) which operate to collect material with a bucket 105 and load material from their bucket 105 into other machines, such as haulage machines 102 (such a loading function can also be performed by some types of shovels 193, e.g. hydraulic shovel excavators); levelling machines 106 (e.g. dozing machines, grading machines, or road rollers); light vehicles 108 (e.g. cars or other light utility vehicles); weigh bridges 110 (which weigh mobile machines such as haulage machines 102 as they traverse the bridge 110); fixed/mobile cameras 112 (which capture footage—still or video—of an area of the worksite 100); drones 114 (e.g. unmanned aerial or ground vehicles operated to periodically perform reconnaissance of the worksite 100). Other types of machines (not illustrated in the figures) may also work on the worksite, e.g. Drills and, in the case of underground worksites, Load Haul Dump (LHD) vehicles. The particular types of machines, and the number of each type of machine, will depend on the nature of the worksite in question.

The various machines operating at the worksite 100 may be directly controlled by human operators, remotely controlled by human operators, be autonomous machines capable of autonomously working/traversing the worksite 100, or be semi-autonomous and configured to perform some functions autonomously and other functions under the control of an operator. Furthermore, and as described below, most of, if not all, machines operating at the worksite 100 are equipped with one or more sensor systems operable to sense, record, and communicate data relating to the worksite 100.

Worksite 100 also comprises a number of locations designated for particular purposes. In this example the locations comprise: a loading location 130 designated as a location at which a loading machine 104 or other resource operates to fill haulage machines 102 with material; a dump location 132 designated as a location at which haulage machines 102 discard collected material; a refuelling location 134 designated as a location which mobile machines can attend to be refuelled; a maintenance location 136 designated as a location which mobile machines can attend to be maintained; and a development location 140 designated as a location at which development of the worksite is being performed. Worksite 100 also comprises designated roads or paths 138 (which may have multiple lanes) linking various worksite locations and along which mobile worksite machines can travel. Other types of locations are of course possible. The particular types of locations, and the number of each type of location, will depend on the nature of the worksite in question.

Over the course of worksite operations, the worksite machines are assigned with a variety of tasks. Such tasks may involve altering the terrain/geography of the worksite 100, recovering material from the worksite 100, reconnoitring/observing the worksite 100, maintaining machines at the worksite. For example: blasting operations are performed to free material from the worksite at a given location (e.g. at loading location 130); a loading machine 104 is assigned the task of loading haulage machines 102 with material at loading location 130; haulage machines 102 are assigned with the task of attending loading location 130, receiving a load of material from the loading machine 104, attending the dump location 132, dumping the material received from the loading machine 104, and repeating; levelling machines 106 may be assigned the task of clearing or levelling either a loading location 130, a dump location 132, a designated road or path 138, or a development location 140 of the worksite 100. Different worksites will, of course, have different tasks requiring completion.

Worksite 100 also comprises a radio communications tower 142 operated to relay messages between various worksite machines and a control centre 160. Control centre 160 is shown in this in this instance as being remote from the worksite 100, however could equally be situated on the worksite 100. A given worksite 100 may well have a number of radio communications towers 142 to increase communications coverage and reliability over the worksite 100. A worksite computer processing system 200 which is a measuring and computing system that operates on the worksite 100, and is distributed amongst the control centre 160 and the various worksite machines.

Figure 2:
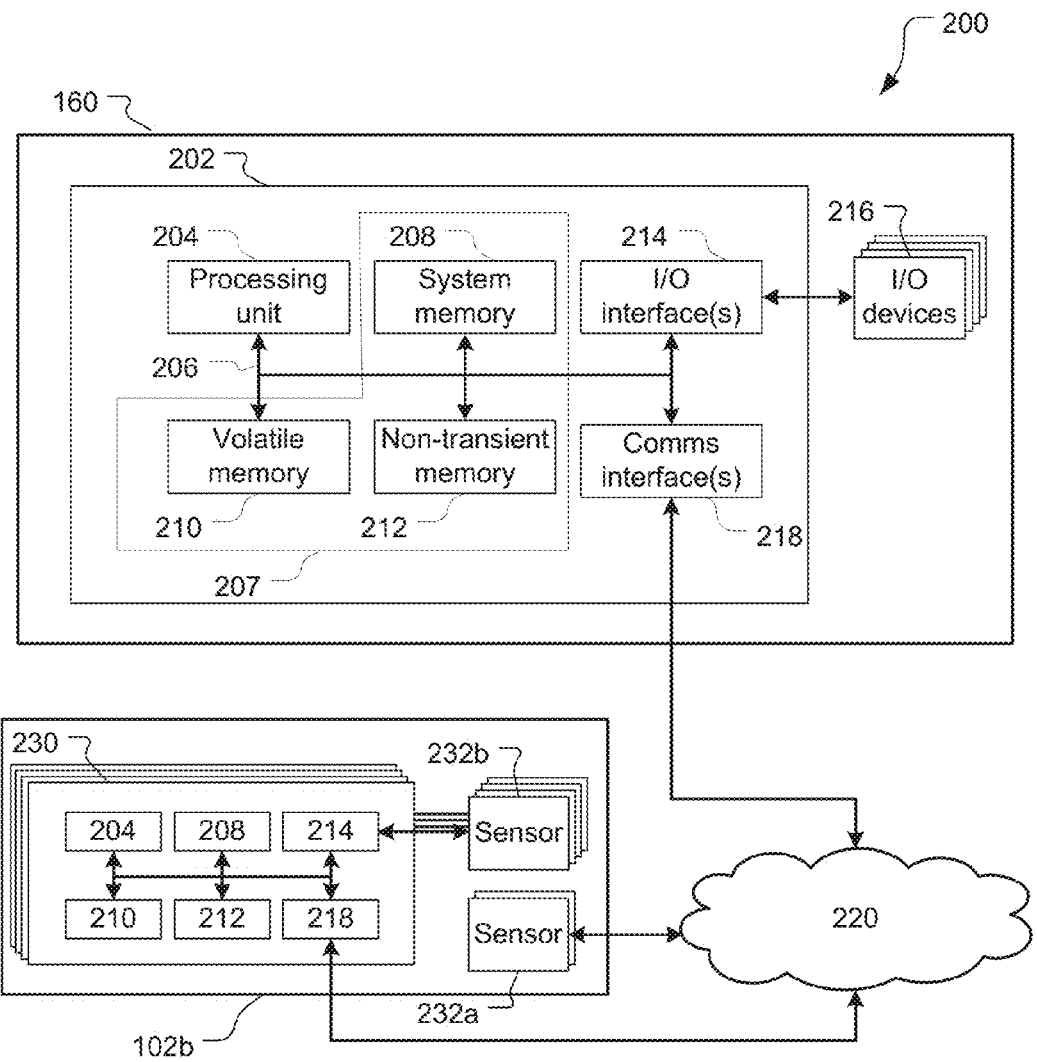
FIG. 2 is a block diagram of the worksite and control centre of FIG. 1.

Turning to FIG. 2, a block diagram depicting worksite computer processing system 200 and control centre 160 is provided.

Generally speaking, the control centre 160 performs a central monitoring and control function for the worksite 100. This function is achieved by receiving information in respect of the worksite, processing it, and communicating information back to the worksite. To enable this, control centre 160 is provided with a computer processing system 202 which also forms part of the worksite computer processing system 200.

Computer processing system 202 (in the present example) comprises at least one processing unit 204 which may be a single computational processing device (e.g. a microprocessor or other computational device) or a plurality of computational processing devices. Through a communications bus 206 the processing unit 204 is in data communication with a memory 207 comprising a system memory 208 (e.g. a read only memory storing a BIOS for basic system operations), volatile memory 210 (e.g. random access memory such as one or more DRAM modules, or combination thereof), and non-transient memory 212 (e.g. one or more hard disk drives, solid state drives, flash memory devices and suchlike). Instructions and data to control operation of the processing unit 204 are stored on the system, volatile, and/or non-transitory memory 208, 210, and 212.

The computer processing system 202 also comprises one or more input/output interfaces 214 which allow the system 202 to interface with a plurality of input/output devices 216. As will be appreciated, a wide variety of input/output devices may be used, for example keyboards, pointing devices, touch-screens, touch-screen displays, displays, microphones, speakers, hard drives, solid state drives, flash memory devices and the like. Computer processing system 202 also comprises one or more communications interfaces 218, such as a Network Interface Cards, allowing for wired or wireless connection to a communications network 220 such as a local or wide area network.

Communication with the communications network 220 (and other devices connected thereto) will typically be by the protocols set out in the layers of the OSI model of computer networking. For example, applications/software programs being executed by the computer processing system 202 may communicate using one or more transport protocols, e.g. the Transmission Control Protocol (TCP, defined in RFC 793) or the User Datagram Protocol (UDP, defined in RFC 768). Alternative communications protocols may, of course, be used.

The computer processing system 202 stores in memory 207 and runs one or more applications allowing operators to operate the device system 202. Such applications will typically comprise at least an operating system such as Microsoft Windows®, Apple OSX, Unix, or Linux.

The computer processing system 202 is configured to perform the relevant method described herein by software which comprises instructions and data which are executed by the processing unit 204 to implement the relevant features of the method. The software is stored on a non-transient computer-readable medium, such as non-transient memory 212 or an external data storage device which can interface with the computer processing system 202 via, for example, I/O interface 214. The software may be provided to computer processing system 202 by means of a data signal in a wired or wireless transmission channel over communications interface 218.

Most, if not all, of the various worksite machines are also equipped with respective computer processing systems 230, which form part of worksite computer processing system 200. Some worksite machines have multiple computer processing systems 230 for performing multiple tasks. For example, a haulage machine 102b may be equipped with a machine vital information management system (e.g. VIMS system as provided by Caterpillar™), a payload monitoring system, a tyre pressure monitoring system, and an operator display/control system. Each of these computer processing systems may be interconnected so as to be able to communicate with each other and/or be configured to communicate independently with an external communications network or system (e.g. control centre 160).

The specific components and architecture of a given machine computer processing system 230 (and the software executing thereon) will, of course, depend on the type of machine in question. For example, a haulage machine will have a far more sophisticated computer processing system 230 than a camera 112. At a general level, however, the computer processing system 230 of a given worksite machine will typically have similar components to computer processing system 202 described above.

The various worksite machines are also equipped with a variety of sensor systems 232 for sensing data relating to the worksite 100 and communicating the sensed data (or information derived therefrom) to the control centre 160 (directly or via another computer processing system such as 230). Sensor systems 232 are part of the worksite computer processing system 200. Sensor systems 232 may be a stand-alone computer processing systems (e.g. 232a) operating separately from the other computer processing system(s) 230 of the machine in question. Alternatively, sensor systems 232 may be peripheral systems (e.g. 232b) or sensors which interface with and are controlled by the computer processing system(s) 230 of the machine in question. In either case, a given sensor system 232 may be configured to communicate data directly to the control centre 160, or may be configured to communicate data to a connected computer processing system 230 (which then communicates that data (or information derived therefrom) to the control centre 160).

As is described further below, a given worksite machine may be provided with one of a variety of different types of sensor systems 232 or multiple sensor systems 232 of the same type or a combination of types. For example, a light vehicle may be equipped with a single camera sensor system, while a haulage vehicle may be fitted with several camera sensor systems.

The computer processing system 230 of each worksite machine also enables the machine to receive messages from the control centre 160 (e.g. via a communications interface 218). These messages can comprise, for example, worksite information (e.g. information regarding the state of the worksite and/or machines operating on the worksite) and task assignment information (e.g. instructions which define new tasks or modifying existing tasks for the machine). Such messages can be displayed or otherwise imparted to an operator of the machine (e.g. via output devices such as displays and/or speakers), or where a new/amended task can be carried out without operator intervention be processed by the computer processing system 230 for automatic implementation by the machine.

It will be appreciated that the foregoing example of the control centre 160 computer processing system 202 (referenced also in the context of worksite machines) is provided by way of non-limiting example only. A wide variety of computer processing systems with different components and/or architectures could be used for the control centre 160 and/or individual worksite machines.

In addition, although FIG. 2 shows only one vehicle, more specifically haulage vehicle 102b, and one computer processing system 230, the worksite 100 will, of course, have multiple vehicles 102, 104, 106, 108, 114 that have respective computer processing systems 230, each computer processing system 230 having or being in communication with at least one sensor system 232, and communicating likewise with the computer processing system 202 of the control centre 160.

Sensor Systems and Measurements

As noted, most if not all of the worksite machines carry one or more sensor systems 232.

Some machines are dedicated worksite monitoring machines—i.e. their sole (or at the very least predominant) purpose is to monitor the worksite. For example, drones 114 may be commissioned to periodically traverse (in the air and/or on the ground) the worksite 100 for the sole purpose of collecting data relating to the terrain of the worksite 100. Such machines will be referred to as dedicated worksite monitoring machines, though it will be understood that such machines may naturally serve additional purposes. For example, a light vehicle may be set up with various sensor systems and be driven around the worksite as a "dedicated" monitoring machine, even though it may also be used to transport personnel around the worksite.

The vast majority of machines that operate on a worksite 100, however, are not dedicated monitoring machines. Rather, the majority of worksite machines are directly involved in the operation of the worksite—e.g. (in the mine context) extracting material from the mine and/or maintaining the worksite (e.g. by developing new areas, building roads, transporting personnel and equipment, maintaining machines and the like). Machines of this type—i.e. that have a primary purpose other than monitoring the worksite—will be referred to as productivity machines (i.e. production equipment). Despite having a primary purpose other than monitoring the worksite, productivity machines also carry various sensor systems 232. For example, heavy machines (e.g. haulage machines 102, shovels 103, loading machines 104, levelling machines 106 and the like) are usually equipped with a large number of sensor systems to assist those machines in performing their assigned tasks about the worksite 100.

It has been recognised by the applicant that even though productivity machines are not dedicated worksite monitoring machines, the data collected by their sensor systems can, in many cases, be used to provide valuable information on the terrain of the worksite 100. Obtaining and using the sensor data from these machines is advantageous as it significantly increases the number of machines, and the number of different sensor system types, from which terrain information can be obtained. By increasing the amount of terrain information gathered, more accurate and/or more up-to-date models of the worksite terrain can be generated.

A given worksite machine may be equipped with a variety of different types of sensor systems, and (in some cases)

multiple sensor systems of the same type. By way of non-limiting example, the types of sensor systems that may be equipped are as follows:

Satellite navigation sensor systems such as, Global Positioning System (GPS) sensor systems for sensing navigation messages from GPS satellites and calculating positional information based thereon. In the description hereinafter, embodiments involving GPS may, in the alternative, use any satellite navigation system. GPS messages will typically comprise information such as: a GPS sensor identifier (identifying the GPS sensor and/or machine to which the sensor is equipped); a timestamp; longitude information; latitude information; altitude information; visible satellites information.

The GPS sensor system may be augmented to add functionality and/or improve its precision. Such GPS sensor systems may be for example, assisted GPS (AGPS) or differential GPS (DGPS). As used herein reference to GPS sensors sensor systems, messages, information and the like is intended to also cover AGPS and DGPS sensors, messages, information and any other augmented GPS sensor systems.

A GPS sensor system will typically be provided on each mobile worksite machine (e.g. haulage machines 102, loading machines 104, levelling machines 106, light vehicles 108, drones 114). In some cases more than one GPS sensor (e.g. two sensors) are included in such machines to enable orientation of the machine to be determined based on the relative positions of the sensors at known mounting positions on the machine.

Inertial Measurement Units (IMUs) for sensing velocity, orientation, and gravitational and acceleration forces. IMUs are typically provided on each machine. IMUs generally comprise accelerometers and gyroscopes, and may also comprise magnetometers and or a pressure sensor. IMU messages will typically comprise information such as an IMU sensor identifier (identifying the IMU sensor and/or machine to which the sensor is equipped); a timestamp; orientation information (if a magnetometer is present); acceleration information.

Inertial Navigation Systems (INSs), which include an IMU and use dead reckoning to track position, orientation and velocity of the machine relative to a known initial position, initial orientation and initial velocity. Optionally, an INS can receive an input from a GPS to provide at least the initial position and, optionally, initial velocity to seed navigation. However, in other embodiments the INS can be initialised by other input means, e.g. by manually entering initialisation information. INS messages will typically comprise information such as an INS sensor identifier (identifying the INS sensor and/or machine to which the sensor is equipped); a timestamp; orientation information; position information, velocity information, acceleration information.

Lidar systems and/or radar systems are typically provided on autonomous vehicles, such as autonomous haulage trucks 102, dozers, and drills. However, generally such machines include at least a Lidar system and optionally a radar system as a back-up for situations in which the Lidar system fails or is ill-suited due to the environment (e.g. cloudy, rainy, snowy or foggy conditions). Lidar and/or radar systems may potentially be provided on any worksite machine (including non-autonomous machines), provided the cost of such systems is not prohibitive.

For autonomous vehicles, the Lidar systems and radar systems are used for collision avoidance, with the relatively higher precision of Lidar enabling them also to be used as part of a Lidar navigation system, as is known in the art. Lidar and radar messages will typically comprise information such as a Lidar or radar sensor identifier (identifying the Lidar or radar sensor and/or machine to which the sensor is equipped); a timestamp; time-of-flight and/or distance of flight measurements to one or more light-reflective or radar-reflective surfaces; and, in the case of multiple reflective surfaces, orientation of the reflective surface with respect to the sensor.

Lidar systems may also be used to determine position of the Lidar sensor by matching a pattern of Lidar measurements with a pattern derived from reference Lidar measurements from known locations. Such pattern matching may be used by Lidar navigation systems to enable navigation in environments with poor or no lighting. Thus, messages from Lidar navigation systems may comprise information such as a Lidar identifier (identifying the Lidar sensor and/or machine to which the sensor is equipped); a timestamp; Lidar sensor position and orientation information; time-of-flight and/or distance of flight measurements to one or more reflective surfaces; and, in the case of multiple reflective surfaces, orientation of the reflective surface with respect to the sensor.

Most worksite machines also are equipped with one or more camera systems—e.g. haulage machines 102, loading machines 104, levelling machines 106, light vehicles 108, weigh bridges 110, camera systems 112, and drones 114. The Camera systems are used to capture visual data (still and/or motion) of the worksite 100. Camera system messages will typically comprise an identifier of the camera system (and/or the machine to which the camera system is equipped); positional information (if this cannot be determined from the camera system identifier); timing information; video or image data. Such camera systems can be time-of-flight cameras which use the time taken for illuminated light to reach the camera to measure distance. Such cameras may therefore be a form of Lidar in which measured point is simultaneously captured in an image, as opposed to being captured by a scan. Alternatively, the camera systems may provide stereogrammetric functionality which look at relative locations of points in image pairs to determine distance to the imaged object.

Articulation sensors systems (i.e. angle sensor systems) are included in shovels 103 and loading machines 104, to control and/or determine the position of their bucket 105. Such systems are also included in grading machines to control and/or determine the position their blade, and drills to control and/or determine the position of their bit.

The articulation sensor systems include one or more articulation sensors at respective articulation joints of the loading machine.

Each articulation sensor measures the extent of articulation (e.g. a measured angle) of an articulating joint that exists between the earth moving implement (e.g. bucket 105, blade or drill bit) and the main body of the mobile machine that includes the machine's cabin. Rotation about the joint articulates a implement-holding portion (or part thereof) of the machine, such as an arm or boom, that extends between the main body of the machine and the earth moving implement. In some machines, the implement-holding portion is comprised of a plurality of articulating bodies connected in series to join the implement to the main body, with an articulation sensor for each articulating joint between the main body and the earth moving implement of the worksite productivity machine.

Articulation sensor system messages typically comprise an articulation sensing identifier (identifying the one or more articulation sensors and/or the machine to which the articulation sensing system is equipped); a timestamp; angular information for each of the one or more articulation sensors.

Pressure sensor systems can be included in any machine to air pressure, from which altitude may be deduced. The deduced altitude be used to improve elevation estimates from the satellite navigation system. Pressure sensor systems can therefore be included in any machine having a satellite navigation system. Pressure sensor system messages typically include an pressure sensor identifier (identifying the one or more articulation sensors and/or the machine to which the pressure sensor is equipped); a timestamp; and pressure.

As used herein, "sensor data" will refer to raw data sensed by a sensor system and measurements that are calculated/derived by processing the raw sensor data.

In one example, for a GPS sensor, the "raw" data of a GPS sensor (at a general level) are a series of satellite messages (from a plurality of satellites) including a message time, a pseudo-random code and orbital position of the satellite sending the message. The GPS sensor system processes this raw data to derive a measurement of the 3-dimensional position of the GPS sensor, such as elevation and 2-dimensional horizontal location. For example elevation may be defined in terms altitude (i.e. with respect to sea level) or some other vertical parameter, and the 2-dimensional horizontal location may be defined in terms of longitude and latitude. Alternatively, the measured 3-dimensional position may be defined with respect to some other 3-dimensional reference frame, for example a reference frame associated with the worksite. Used herein, therefore, the "sensor" data of a GPS sensor may comprise one or both of the raw GPS sensor data and the processed GPS sensor data. Similarly processing the raw sensor data from an INS or IMU can be used to determine a 3-dimensional position coordinate and/or an orientation of the INS/IMU.

In other sensor systems, the processed sensor data measures a positional relationship the sensor system and a body measured by the sensor system. For example, various machines are equipped with Lidar and/or radar sensor systems, which respectively can measure distance between the sensor and a light or radar reflective surface. Likewise, in the case of an articulation sensing system, the processed sensor data may be pose (i.e. position and orientation) of an earth-moving implement of the of an worksite machine (e.g. a bucket of an excavator 103 or loader 104, or a blade of a grading machine 106) with respect to a reference position on the worksite machine. The pose information can be used to determine positions associated with the earth-moving implement, e.g. the position of its ground engaging portion. This information can be used to determine the position of the ground engaging portion when it engages with the ground.

During operation of the worksite 100 sensor data (amongst other data) is collected from the wide variety of sensor systems operating on the various worksite machines (dedicated worksite monitoring machines and productivity machines). From the sensor data, measured positions of the surface of the worksite 100 may be determined. As used herein, the term "spatial data" refers to data that defines measured positions of the surface of the worksite. The measured surface may correspond to a surface mine, e.g. an open-cut mine, or may be an underground surface of an underground mine worksite. Depending on how the spatial data is derived, some positions represented by the spatial data may be accurate, at least at the time of measurement, to centimeter accuracy, e.g. less than 10 cm, or for some instrumentation, less than or equal to 5 cm. This may be the case, for example, if the measured position is determined based on a high precision GPS (e.g. a real-time kinematic (RTK) GPS).

In some cases, the spatial data that defines the measured positions on the worksite surface is derived from information from more than one source of sensor data. For example, where sensor data defines positional information from a first type of sensor on a mobile machine to the surface of the worksite, further information is required to reference the determine the actual position of the surface (i.e. with respect to a fixed 3-dimensional reference coordinate system). The actual position of the surface can be determined by taking into account the position and orientation of the mobile machine with respect to the fixed coordinate system, as determined based measured data from one or more of further sensors. The determination of the spatial data can be done either on the control centre processing system 202 or the machine processing system 230. In the latter case, the machine processing system includes the spatial data in a message that it sends to the processing system 202.

Messages in which sensor data and/or spatial data, and metadata is communicated to the control centre 160 will be referred to as incident messages. Incident messages are typically communicated/received as they are generated, and will have been generated in "real time" upon receiving the raw sensor data. In some cases, however, incident messages are communicated/received in batch mode—for example due to communication network/processing system limitations, but will in either situation include time data that is correlated with, and/or indicative of, the time at the which the raw data was measured. At the computer processing system 202 of the control centre 160 incident messages (or, at least, the data/information carried by the incident messages) are stored in one or more databases maintained, for example, in non-volatile memory 212.

The metadata in the incident messages includes the time data, which is indicative of a measurement time at which the sensor data or spatial data has a known precision or accuracy. The longer the delay, the greater the chance that the terrain features will change from when it was measured, and that the precision or accuracy of the sensor/spatial data will no longer be known.

To ensure that the sensor or spatial data is representative of the terrain, the represented time is within a maximum predetermined delay from the actual time of measuring the raw data. For example, the represented time may equal the measurement time at which the sensor measures the raw sensor data. Alternatively, the represented time may be a time at which processed data was derived or calculated from the raw sensor data or a time associated with compiling or sending the incident message, provided that the represented time is sufficiently close to the measurement.

It is also useful to be able to tell which data is more recent in the case that two or more machines are working in the same area. This requires enough time resolution to distinguish between the motion of two machines, such as large machines that move at a few kilometers per hour.

Given the expected velocities of the mobile machines, the maximum predetermined delay is for most applications within a few seconds of measuring the raw data, e.g. less than 5 seconds, but in some cases, the predetermined delay is in the order of milliseconds.

In some embodiments the time data is a number that equals the represented time that is within the predetermined delay from the time of measurement, while in other embodiments, the time data is a number that indicates an amount of time that has passed since the represented time, but in such a case will generally also include a timestamp at which that number was determined so that the represented time can be accurately calculated from the time data.

the metadata in each incident message also includes data that identifies the source or sources from which the measurement was taken. The identified source(s) may be characterised by (i) a machine identifier that can identify a particular machine or type of machine from which the measurement was taken; and/or a sensor identifier for identifying sensor (e.g. by a unique code, such a serial number) and/or the type of sensor that measured the sensor data. The indicated type of sensor may be an indicated class of technology (e.g. Lidar, radar, or GPS) and/or a more specific sensor type, such as a type of sensor within a given class.

Further, in some applications certain machines will be known to have certain sensors, whereby the specific sensor(s) and/or type sensor(s) may be determined from knowing the machine or the type of machine. Conversely, the specific type of machine may be determined from knowing the sensor or type(s) of sensor that measured the sensor data. Such information can be determined from a look-up table which lists which machine identifier corresponds with which sensor identifier, and which is stored in computer processing system 202.

The incident messages received by control centre 160 may additionally or alternatively include information configured to be included in position data libraries on control centre 160 for various worksite management functions. Such libraries identify measured spatial positions on the worksite (as a set of three dimensional coordinates) with respect to a fixed reference frame, and the time data corresponding to each measured coordinate. Thus each library is comprises sets of x,y,z,t coordinates. Examples of such libraries include: (i) Position Reports that define positions based on GPS and, optionally, IMU measurements; (ii) Dipper reports, which identify positions based on a combination of GPS data and articulation/angle sensor data; and (iii) Lidar point clouds, which are sets of x,y,z,t points representing a 3d scan of the surface captured using a Lidar. In the case of Lidar data, all t values (i.e. time data) for a given data set is roughly the same, given that the scan occurs over a relatively short time-period. However, if measurements are captured by a time-of-flight Lidar camera, all t values in a given data set will be the same.

Examples of how sensor data may be used to provide x,y,z,t coordinates in a message to the control centre 160 are described below.

GPS when used singly can provide information on the information on the elevation at a point. This information may be transmitted to the control centre 160 in a Position Report message or as an entry in a 'Snippet file' (a proprietary format binary file containing x,y,z,t coordinates from a machine).

GPS when used in a pair (such as on autonomous truck or dozer blade) can provide angular pose information (heading, pitch and yaw). This information may be sent to control centre 160 in Position Report messages.

Time-of-flight radios are used underground (where GPS is not available) to estimate machine location using triangulation from known base stations. This information may be included Position Report messages.

IMU information, based on accelerometers, magnetometers gyroscope, and pressure sensors, can be used to augment GPS positioning information through periods of poor satellite coverage. This information may be included in Position Report messages.

Angle (i.e. articulation) Sensors can be used to instrument booms of loading tools, grading tools and drills to allow determination of bucket, blade or bit position or pose when combined with GPS location of machine. This information may be included in Dipper Report messages.

Lidar derived positions based on 3D scans of surface surrounding a machine may be sent to control centre 160 as point cloud data.

Cameras derived positions based on 3d measurements of surface when used in stereo or on consecutive frames of image series, may be sent to the control centre 160 as point cloud data.

Radar can be used to sense location of ground, slope or obstacles relative to a machine's location. This information may be sent to the control centre 160 as ranging data that identifies a measured distance. However, unlike Lidar scans or camera derived distance ranging, radar does not have the same degree of directional resolution as Lidar or camera derived measurements. Thus a radar measurement will thus generally be recorded as a signal measurement for a corresponding time, rather than as a point cloud having the same or generally the same time value.

Pressure sensors can be used to augment elevation estimates from a satellite navigation system. The augmented elevation estimates may be included in Position Report messages.

Terrain Model

To assist in the management and operation of the worksite 100, the computer processing system 202 of the control centre 160 is configured to process incident messages (in some cases together with other known worksite information, as described below) to generate and refine a terrain model of the worksite. For example, some mobile machines, such as haulage machine 102, may be autonomous, whereby they use their computer processing system 230 to navigate the worksite 100 without human intervention or direction, based partly or entirely on the terrain model.

In the present specification, the 'terrain model' of the worksite is a terrain dataset which includes data describing the elevation at different locations across the a surface of the worksite 100, as estimated at a given point in time. As used herein, the term 'terrain model' is intended to encompass the possibility of further data in addition to these positions. For example, the terrain dataset may also include metadata about the positions. Such metadata may include, for example, one or more of: time information defining an age of the elevation values or time at which the data elevation values were measured or estimated; whether the data corresponds to measured or estimated data; for measured data, information on the type of sensor and/or machine from which data was measured; and an estimated error of the position in the digital elevation model.

In the art, the terms "digital terrain model", "digital elevation model" and "digital surface model" are often used to refer to models that describe the elevation at different horizontal locations, but the definition of these terms in the various literature is somewhat inconsistent, and these terms are sometimes used interchangeably, despite potentially having different meanings, depending on the context. For example, such models can be used to describe the elevation information at locations on the surface of the earth, and can be inclusive or exclusive of height of objects such as buildings or machines located on the earth.

To avoid confusion, digital models that are inclusive of heights of such objects are referred to herein as Digital Surface Models (DSMs), whereas digital models that are exclusive of height of such objects are referred herein as digital elevation models (DEMs). In the present disclosure, reference to "elevations" and "positions on the surface of worksite" and the associated models described hereinafter refer to positions/elevations exclusive of the height of such objects, i.e. they concern the earth itself and are thus described in relation to a DEM. However, if desired, a DSM may be constructed from the DEM and additional geometric information concerning any known objects/machines on the surface of the earth. A "terrain model" as used herein includes a DEM and, in some embodiments, further data and/or models, as described herein.

The DEM is generally recorded in a raster format, and defines a rectangular grid of matrix values, the grid location corresponding to a 2-dimensional location coordinate (e.g. meters north and east compared with a reference location). The value stored at each grid location defines the elevation at the coordinate. The elevation value may be directly measured data or may be estimated (e.g. by interpolation) or transformed from other measured elevation data. As an alternative to raster format, the DEM may be converted to and stored as a vector-based representation, such as a triangulated irregular network (TIN).

In a mine worksite there is a particularly high risk that some parts of a DEM will be missing data points (i.e. surface positions) and/or some data points of the DEM will have a high error. This is because measurements of the terrain are only recorded periodically or even sporadically, and may not be taken for all locations on the worksite. As a result some parts of the worksite will have no collected elevation information or the elevation information will be out of date. This may particular be the case at parts of the worksite that are in a state as flux, such as at loading locations 130 and dumping locations 132. For example, where a digging operation is being performed by loading machine 104, worksite surface positions previously measured by a survey or by drones 114 that is even a half an hour old may be too old to be relied upon. Consequently haulage machine 102, may therefore not be able to self-navigate to a position needed to receive ore from the loading machine 104, or the haulage machine 102 may not be able to safely move to a new location or orientation to collect further ore. Further, other decisions relating to maintenance or operation of the mine can be comprised or restricted if the model is inaccurate. Therefore, the DEM requires ongoing maintenance and updating as more measurements of the terrain are recorded, and the more accurate the terrain model, the better.

Industrial Applicability

Exemplary processes for generating a terrain model in accordance with the present disclosure will now be described. A first method 300 is described with reference to FIG. 3. At step 302, a processing system receives information that includes the sensor data and metadata associated therewith. From the sensor data, spatial data defining the measured positions on the surface of the mine are determined. As has been discussed, this can be performed by processing system 202 of the control centre 160, or by processing system 230 and then transmitted to processing system 202. Such spatial data can, for example be included in the position data library messages, such as Lidar reports, Dipper reports, Points clouds etc., as discussed above. Such position data library messages will also include the time data and the source identifier (e.g. machine identifier). However, the process of determining the spatial data is the same in both instances, but is hereinafter be described in the relation to the processing system 202 of the control centre 160.

To generate a terrain model processing system 202 collects data points that are representative of the worksite surface to form a terrain dataset. The data points are derived from spatial data that defines measured positions the surface of the worksite 100.

The spatial data is derived from the sensor data measured any sensor system. As discussed above, sensor data from a large number of sensor systems of different types is constantly received by system 202 in incident messages. In addition to the sensor data, the processing system 202 of the control centre 160 also knows (i.e. has stored in memory, has access to, or can calculate) and makes use of known worksite information relevant to the worksite 100.

Determining Spatial Data Defining Measured Positions on the Surface of the Worksite The process 300 can be applied to any sensor data from which measured positions (i.e. spatial data) on the worksite can be determined. However, as an exemplary process of determining such measured positions, process 300 will be described in relation to an embodiment in which the sensor data is GPS sensor data. Further examples of determining measured positions on the worksite from sensor data are described elsewhere in this specification.

At step 304, the computer processing system 202 determines the spatial data based on the sensor data (in this example GPS sensor data) and extracts the time data from the metadata. If the 3-dimensional position coordinates of the GPS sensor have not already been determined from the GPS sensor data (e.g. by the mobile machine's processing system 230), this determination is performed by the computer processing system 202. The 3-dimensional coordinates may be with respect to any frame of reference. For convenience, the determined position is referred to herein by longitude, latitude and altitude coordinates. However, it is appreciated that the GPS data will often be transposed to a reference frame having a different elevation reference (i.e. not sea level) and different horizontal axis (i.e. perpendicular axis, but not necessarily aligned with the longitudinal and latitudinal axes).

The computer processing system also receives information corresponding to the type of mobile machine on which the GPS sensor was mounted. This information may be received from stored information in non-transient memory 212, for example if GPS sensor data from only one type of machine is expected. However, in the presently described embodiment, it is received in the metadata of the incident message that included the sensor data. More particularly, the information corresponding to the type of mobile machine is provided in the form of a source identifier included in the metadata.

The information corresponding to the type of mobile machine includes dimensional information indicating the height that the GPS sensor is above the worksite terrain. This height is derived from the known dimensions of that mobile machine and known mounting location of the GPS on the machine. The processing system 202 determines the elevation of the measured position on the surface of the worksite by subtracting this height value from the determine altitude position of the GPS sensor, and pairs the determined elevation with the horizontal location of the GPS sensor to determine the measurement of the position on the surface of the worksite beneath the mobile machine. This process is repeated for other GPS locations received from the GPS sensor to derive a collection of measured worksite surface positions. The measured positions are stored in non-transient memory 212 along with an error value for the measurement. The error value takes into account the error in the GPS measurement and the uncertainty in the assumed height value due to the potential for rough or uneven ground beneath the mobile machine.

Alternatively, more precise estimation of the worksite surface positions can be determined using a similar method but based on sensor data from a sensor system that measures both the position and orientation of the mobile machine. Such a sensor system may for example include a GPS sensor system and, optionally, an IMU or magnetometer. By knowing the orientation and dimensions of the machine, the processing system 202 can determine the precise position of the mobile machine's wheels or tracks in relation to the sensor system. Since the wheels/tracks are known to be in contact with the surface of the worksite, this surface measurement method has a reduced uncertainty compared with estimating the surface position beneath the machine's undercarriage.

The determined surface positions are stored as spatial data in non-transient memory 212, along with the corresponding time data from the metadata. More particularly, the stored data will be a multi-dimensional array comprising: 3 parameters for space (i.e. the determined measured position); a parameter for time data, a source identifier (which may comprise a sensor-type identifier and/or a machine-type identifier), and an error parameter.

Predict Current Positions of the Surface of the Worksite

With each new measured position received by processing system 202 (or determined by processing system 202 upon receipt of sensor data), the processing system may be triggered to predict surface positions within a predefined proximity (e.g. 50 meters) of the measured position. This prediction is performed for all locations in the raster matrix that are within the area of the worksite within the predefined proximity of the received or determined measured position. In alternative embodiments, computational load on processing system 202 is reduced by performing the predictions on a periodic basis (e.g. every minute) to allow for multiple or batches of measured positions to be determined/received before triggering the prediction algorithm. The prediction proceeds in the same manner as described above, but for an predefined area of the worksite, or for an area having predefined positional relationship to one or more of the received/determined measured positions. For example, new predictions may be limited only to an area or areas of the worksite undergoing terrain change.

At step 306, computer processing system 202 predicts current positions of the surface of the worksite from past position measurements. In some embodiments, the "current" positions are the positions expected at the time of calculating the prediction. However, in other embodiments, a broader definition of "current" may apply. For example, what defines a "current" position may be a position predicted for a time within a predefined acceptable limit from the present time or time of making the prediction. For example, the prediction may be for a time within a predefined number of minutes, hours, or days from the time of making the prediction. In other cases, other definitions of "current" may be used. However, in any case, the current position provides updated position information by using past measured positions of the surface of the worksite to predict a position of the surface of the worksite for a subsequent time. The past position measurements used in the prediction include elevation measurements at respective locations at which the elevation of the surface has potentially changed with time, and therefore may be different to the elevation at that location at the current time. The prediction is derived from a calculation that is a function of at least the spatial data and the corresponding time data.

The calculation is reflective of a characteristic of the worksite that is function of how the measurement error is expected to change with increasing elapsed time from the time of measurement and increasing distance from the measurement, due to the expected mining activity at the position on the worksite that corresponds to the measurement.

The prediction is based on correlations in worksite terrain that are a function of the position and/or activity information deduced from the sensor or spatial data and metadata. Specifically, the present disclosure identifies that there are correlations between a position measured at a certain time and (i) positions at later times (with the extent of correlation decreasing as the age of the measurement increases); and (ii) positions at different locations (with the extent of the correlation decreasing as distance from the measured position increases).

the extent of the correlation is used to weight the measured positional information to predict positional information at different locations and/or later times (i.e. at the current time, so as to build an up-to-date model of the terrain). The weighting is dependent on the extent of correlation such that position measurements that have a higher correlation to a given location and a given subsequent time are attributed a higher weight.

The current positions are predicted from the measured positions known to have existed, and which are defined by the spatial data. For example, the prediction may be a weighted average of measured elevations that are at locations within a predetermined vicinity of a location at which the elevation is being predicted.

In the prediction is based on a Gaussian process of interpolation. In the described embodiment, the measured positions are weighted according to an inverse distance and time weighting function to predict the elevation at a given location. The weighted average is according to the following equation for a set N of measured elevation values $u_i$ at respective horizontal locations $x_i$, as determined at time $t_i$ to be within a known error, wherein i=1, 2, ... N.

$$u(x, t, e) = \frac{\sum_{i=1}^{N} w_i(x, t, e) u_i}{\sum_{i=1}^{N} w_i(x, t, e)}$$

where:
x is the horizontal location for which the elevation is being predicted;
t is the time for which the elevation is being predicted;
e is an error weighting factor;
u(x,t,e) is the predicted elevation at location x;
and $w_i$(x,t,e) is a weighting function.

The following is an exemplary weighting function which may be used for the present method:

$$w_i(x,t,e) = (a + b/((\delta x_i + c)(\delta t_i + d)^2))e_i$$

where:
$\delta x_i$ is the distance, measured in meters, between the location x being evaluated and the location $x_i$ of the ith measured position;

$\delta t_i$ is the age of the measurement (measured in seconds), which is the difference between the current time (for which the elevation is being predicted) and the time $t_i$ at which ith measured position was determined; in other words it is the elapsed time since $t_i$;

$e_i=1/\sigma_i$ wherein $e_i$ is an error weighting factor for the ith measured position and $\sigma$ is the standard error (in meters) of the ith measured position.

a, b, c and d are empirically derived constants.

In other embodiments different precision measurements may be used instead of standard error. For example, standard deviation may be used.

in one embodiment, the measured positions on the surface of the worksite are positions where the ground engaging portion of the bucket of a wheel loader has engaged with the worksite. In such an embodiment, the following values have been determined from observed correlations in time and distance:

a=1,
b=10,000,
c=2, and
d=0.0001

In this example, the parameter d has no noticeable effect on the weightings because the values for $\delta t_i$ will generally orders of magnitude larger than d. However, a non-zero value is selected for d in order to avoid the possibility of a divide by zero error.

As can be seen from the above equations, each measured elevation at a location within the predefined vicinity is weighted depending on a horizontal distance between its corresponding location and the location at which the elevation is being estimated. The distance can in some embodiments be a distance that is resolved into a predefined axis, e.g. longitudinal or latitudinal distance, but will generally be the distance between the locations taking into account components from two orthogonal horizontal axes (e.g. longitudinal and latitudinal). Thus although location in the above locations is represented above by a single parameter, x, it will in practice generally be represented by two coordinates (e.g. longitudinal location and latitudinal location).

As can be seen from the exemplary inverse distance and time weighting function, above, the extent of the weighting is inversely related to the distance so spatial data that is further from the location of the surface being estimated is given less weight than spatial data that is closer to the location.

Each measured elevation at a location within the predefined vicinity is also weighted depending on an elapsed time that is either represented by or derived from the time data. The elapsed time is representative of the age of the measurement that determined the measured position. More particularly, it is the elapsed time since the represented time in the time data corresponding to the measurement.

Appropriate constants can be selected by measuring surface positions at different times and determining correlation with time. For some characteristic functions of the worksite, the correlation of a surface's elevation to elevations at other distances is a strong function of time when the new surface measurement data has been received. This is particularly the case where the surface data measurements correspond to earth-moving events, for example where the measurement identify positions at which an earth moving implement, such as en excavation or loading bucket or a grading blade, has engaged with the ground.

In such cases, new surface data measurements occur in regions where earth-moving work is currently in progress, so the surface in that region is likely to be in a state of flux.

Therefore when predicting the location at a given location, x, based on recent measured distances, nearby measurements that were recently recorded are given significantly more weight than measurements the same distance away but which are only a slightly older, as there older measurement will be less correlated than the new measurement.

On the other hand, in areas of the worksite not currently being worked, all measured positions in the area will be old (having a high $\delta t_i$). Since no new measurements have been received, it can be implied that no new ground-affecting events have occurred. This will generally be the case where the earth has been manipulated to reach an intended design (e.g. to be shaped into a haul road of an intended grade). Since the ground in such an area is no longer in a state of flux, small differences in the age of different data measurements has little, if any, effect on the correlation of those measurement to the terrain at nearby/neighbouring locations. In such cases, the correlation is generally a function of changes in distance, but not particularly a function of changes in the age of the measurement. Thus, for a set of old measured positions, the weighting function is configured to mostly independent of the age of the data.

To achieve this effect, for a weighting function, $w_i(x,t)$ or $w_i(x,t,e)$, the first partial derivative with respect to the age $\delta t$ of the measured position is negative (so that newer measurements are weighted more than old measurements), and the second partial derivative with respect to the age is positive, causing changes in age to have reducing influence on w, as age increases. This can be provided, for example, by having using weighting function that is inversely proportional with a positive power of measurement age (e.g. inversely proportional to be $\delta t^{0.5}$, $\delta t$, $\delta t^{1.6}$, $\delta t^2$, etc.), possibly including one or more offsets to (e.g. constants a or d, in the provided example). In the specific example of $w_i$ described herein, the weighting function is inversely proportional to the square of the measurement age.

The weighting function also has a first partial derivative with respect to distance $\delta x$ that is negative (so that distant measurements are weighted less than close measurements). In other words the weighting function has an inverse relationship with measurement distance, possibly including one or more offsets to (e.g. constants a or c, in the provided example. In the described exemplary weighting function $w_i$ is inversely proportional to the $\delta x$.

The combined effect of these partial derivatives with respect to distance and age is that for a potential dataset of measured positions within a fixed distance from a position to be predicted, the contribution of distant positions is greater when the measured positions are old than when the measured positions are new.

An experiment by the present inventor has indicated that for wheel loaders, once the measurements around the wheel loader are approximately 180 seconds old or older, the correlation between those measurements is largely independent of the age of the measurement. This has been found to be well represented in the weighting function $w_i$ by having the weighting function inversely proportional to the square of the age of the measurement, with the age being represented in seconds.

To exemplify this effect, consider measurements 1 second old and 4 seconds old. The weighting functions differ by a factor or 4 squared divided by 1 squared, i.e. by a factor of 16. By contrast, for measurements 180 seconds older, i.e. taken at 181 second old and 184, the weighting functions differ by a factor of 184 squared divided by 181 squared, i.e. by a factor of 1.03. Thus, weighting factors applied to the measurements 3 seconds apart, that are 181 and 184 seconds old respectively, are almost the same. By contrast "new" measurements that are 1 and 3 seconds old respectively, have weighting factors that differ by a factor of 16.

as has been discussed, the weighted average of measured elevations is applied to locations within a predetermined vicinity of the location at which the elevation is being predicted. In the case of a wheel loader a useful predefined vicinity has been found to be locations within 50 meters of the location at which elevation is to be predicted, because a data collected by the present inventor has indicated that after about 50 meters, semivariance begins to significantly increase.

Since a set of older measurements (e.g. older measurement greater than 180 seconds) are weighted, with respect to each other, in a manner that is generally independent of their age, whereas newer measurements (e.g. less than 180 seconds old) are weighted, with respect to each other, in a manner that is substantially dependent on their age, this has an interesting effect when coupled with the inverse distance component of the weighting function. Specifically, the effect is that measurements that are further away from the position being predicted have a greater influence on the predicted elevation for cases in which the prediction is based on a set surface position measurements that are all relatively old, compared being a set of surface position measurements that includes relatively at least one new measurement. Generally for such data "relatively old data" would be more than 180 seconds old since the time of measurement, whereas the new measurement would be less than 60 seconds old, or could be defined as less than 30 seconds.

Upon calculating the predicted positions the worksite surface, the 3-dimensional coordinates of the predicted are saved to non-transient memory 212, along with an error value that represents the error in the predicted elevation for the given location corresponding to the predicted elevation.

Determining Terrain Model Error

As has been discussed above, the error varies across the digital elevation model. There are variety of factors that contribute to error in the terrain model described herein.

Firstly, an error is associated with each measurement by a sensor system due to the finite precision of the sensor system. The error can vary from measurement to measurement, and for this reason some sensor systems report an error that corresponds to each reported measurement. For example, the error may be reported as a standard error, which may be based on the variation of recent measurements. As an alternative to standard error, any other statistical measure of error may be employed, e.g. standard deviation or variance. Further, since the errors correspond to a determined 3-dimensional position, the error can be dimension specific, such that the error is represented as a 3-dimensional error, e.g. having different x, y, and z components, e.g. as may be reported from a GPS.

Secondly, different measurement sources may have different error associated therewith, e.g. high precision compared with low-precision GPS, or radar compared with lidar.

In some cases a fixed standard error may be assumed for a given sensor system based on a prior characterisation of the sensor system's performance. In some embodiments, the error may be reported as an error ranking, e.g. high, medium or low, and the processing unit 230 or 230, upon receiving the error ranking, can attribute an error as a distance (e.g. in meters) that corresponds to the error ranking.

Thirdly, if a surface position is predicted based on a plurality of measured positions (e.g. by weighting the measured positions as described herein), then the errors of the measured positions will impact the error of the predicted position.

Accordingly, in one embodiment of the terrain dataset (i.e. terrain model) disclosed herein, the terrain dataset maps determined positions and the errors corresponding to the positions. For example, the terrain dataset may define both a DEM and an error model which identifies an error for each position defined in the DEM. For example, the error may represent an absolute or relative error in elevation for each 2-dimensional horizontal location coordinate represented in the DEM.

As used herein, "error" is intended to be expressible in a variety of manners to refer to any metric of accuracy, precision (e.g. standard error) or uncertainty or suchlike, which may be expressed as absolute number (e.g. accurate to within X meters) or a percentage or ratio of an associated value (e.g. accurate to within Y percent of the associated value) or percentage or ratio measure of confidence in the associated value (i.e. a higher percentage meaning more confident). However, reference to a higher or greater error is intended to indicate a lower degree of confidence in the relevant parameter.

As some mobile machine, especially autonomous mobile machines, are reliant on the terrain model to navigate the worksite, it can be beneficial to know the error of the DEM (or DSM) or a part thereof. More particularly, by knowing the error in the elevation model across the worksite, personnel can assess whether the machine can confidently traverse across a particular part of the worksite without a significant risk that such traversal would result in an accident. Such an assessment based on the DEM error is aided by generating a visualisation of the error. A 3-D visualisation can be of particular assistance to personnel, although other forms of error visualisation can also be beneficial.

An exemplary method for determining a terrain model that maps determined positions and the errors corresponding to the positions will now be described.

Firstly, processing unit 204 and/or processing unit 230 determine positions of the surface of the worksite from measurements using the sensor systems on the worksite machines. Where more than one sensor system is used to determine the measured position, a standard error is derived by combining the standard errors received from the contributing sensor systems. For example, this can be achieved by converting the standard errors to fractions of their corresponding measured values and then adding the fractions that correspond to each contributing error to determine the standard error $\sigma_i$ of the measured position.

In one embodiment, processing unit 204 generates a terrain model that maps the measured surface positions and the errors corresponding the positions. In some embodiments, however, the terrain model additionally or alternatively includes positions that are predicted surface positions, with the prediction being based on a weighting of measured positions, for example using the prediction method described herein. In this case, processing unit 204 estimates the corresponding error for the determined prediction of position, with the error being dependent on the source of the measured position. The error estimation's dependency on the source may differ based on the sensor or combination of sensors used to derive the measured position, and optionally, may also be based on the type of machine to which is associated.

Figure 3:
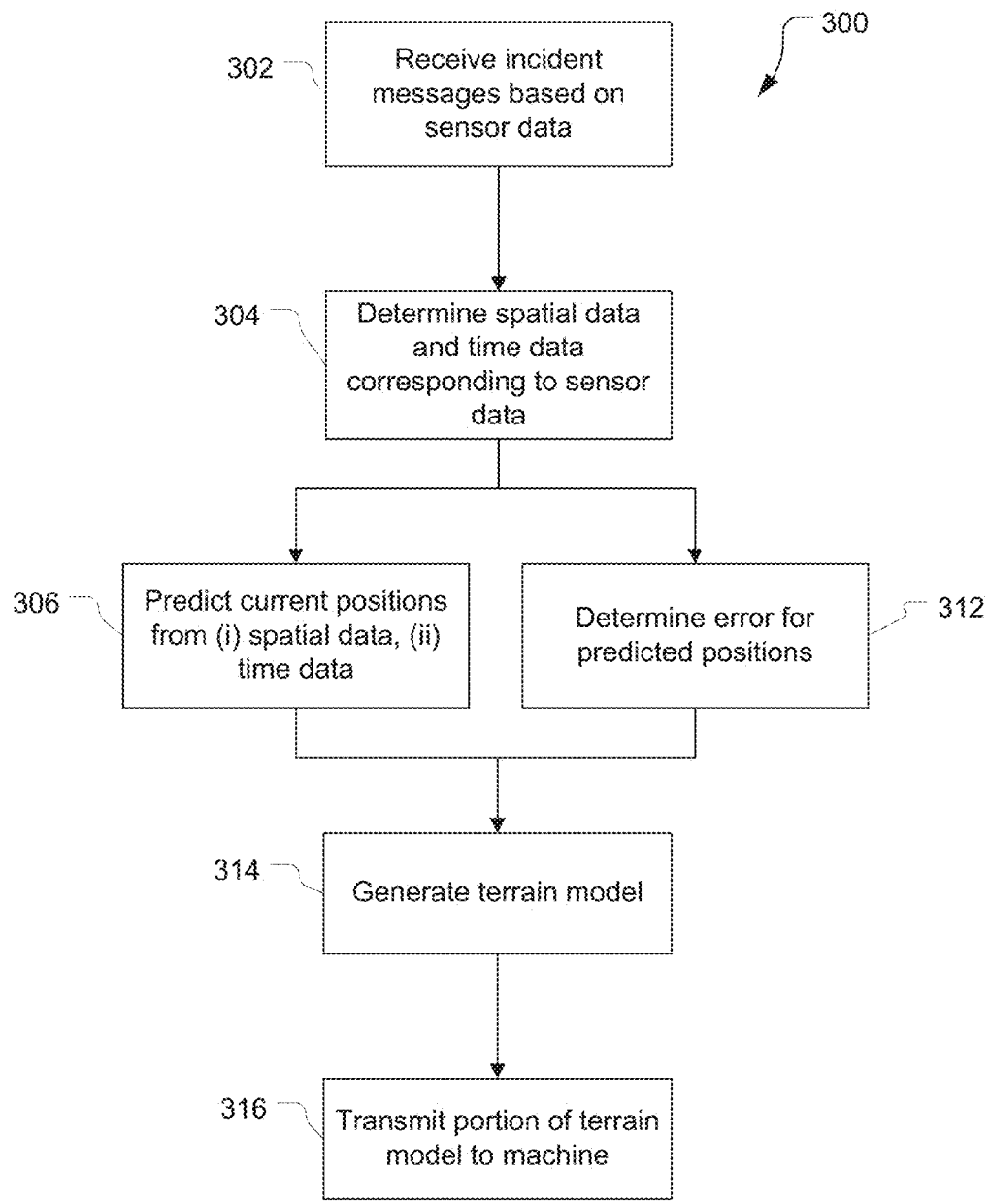
FIG. 3 is a flow diagram illustrating data processing stages in accordance with an embodiment of the present disclosure.

Referring to FIG. 3, the estimation of error associated with each predicted position is performed at step 312, in parallel or sequentially with the step of predicting positions of the worksite surface.

For example, the error associated with a predicted elevation at a given location x is, in one embodiment, calculated as the weighted RMS value of the errors $\sigma_i$ of the respective measured positions $x_i$ used to predict the elevation at location x.

To illustrate an exemplary estimation of error based on a weighting of the errors (e.g. standard error $\sigma_i$) associated with the respective measured positions, the error value at a predicted surface position x, can be estimated by the following equation:

$$\text{Error}(x) = \sqrt{\frac{\sum_{i=1}^{N} w_i * \sigma_i^2}{\sum_{i=1}^{N} w_i}}$$

In the above example, $w_i$ is a weighting function, which may be the same as the weighting function $w_i$ previously described to reflect the correlation characteristics that have been determined in relation to distance in time. However, in some embodiments a different weighting function may be used.

Generate Terrain Model

At step 314, processing system 202 generates a terrain model using at least one of the predicted positions of the worksite surface.

The terrain model is recorded in file in a raster format which defines a rectangular grid of matrix values, the grid location corresponding to a 2-dimensional horizontal location coordinate. The location may be represented by longitude and latitude coordinates, e.g. as determined from GPS data, or converted to another frame of reference, e.g. meters north and east compared with a reference location, or resolved into two other perpendicular horizontal reference vectors. At each grid location, an elevation value is stored defining the determined elevation at the horizontal coordinate defined by the grid location. Since the model is measured with respect to a polar-type co-ordinate system, the model can be "flattened out" to reduce the effect of the curvature that is inherent a polar coordinate system. This can be achieved by adding offsets to the coordinate values, to transpose the x, y, z coordinates to easting, northing and elevation coordinates respectively.

Initially, elevation values at each grid location are generated from manually surveyed data using techniques that are known in the art. However, as new measured positions and predicted positions of the worksite are determined they are included in a raster matrix. If no previous elevation value was previously present in the raster grid at the location of the predicted position, the predicted elevation value is added at that grid location. However, if an elevation value already exists at the grid location, processing system 202 compares the error value of the predicted elevation with the error value of the existing elevation value at the grid location. If the error value of the predicted elevation is less than the existing elevation value at the grid location, the predicted elevation value replaces the existing elevation value.

The resulting raster forms a digital elevation model (DEM) of the worksite. The processing system generates a visual model of the DEM by plotting the elevation values against their respective locations, using known 3-D an image rendering techniques, and displays the visual model on a display screen that is an I/O device 216 connected to processing system 202.

Figure 4:
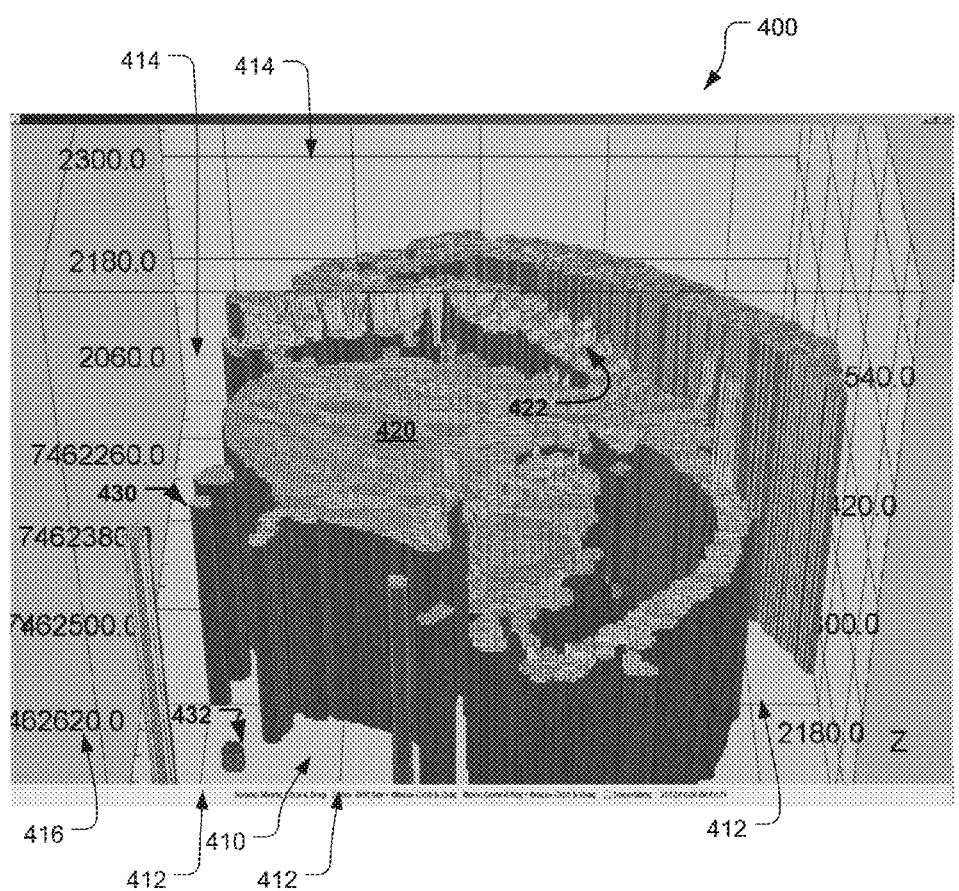
FIG. 4 is a visualisation of digital elevation model aspect of a worksite terrain model.

FIG. 4 illustrates an exemplary visualisation of the DEM 400 produced according to the presently disclosed method. The visualisation illustrates the horizontal area of the worksite mapped to x-y plane 410, having grid markers/lines 412 with regular spacing in the x-y plane, and grid lines 414 in the elevation plane z, to depict the scale of the worksite depicted by the DEM. At the scale illustrated in FIG. 4, the grid lines 412, 414 are spaced in 120 meter intervals, the with elevation values generally being between the 2060 meter and 2300 meter grid lines 414. A "northing" position values, y, are also depicted by grid line values 416, being in the order of 7,462,620 meters to 7,462,260 meters. "Easting" position values, x, are also depicted in the visualisation, although the easting values are not displayed in FIG. 4.

DEM 400 shows surface positions to different levels of accuracy for different parts of the worksite. For example the "middle" portion 420 DEM, which maps a middle area of the worksite, shows a relatively smooth surface compared with haul road portion 422. This is because the middle portion 420 was mapped based on measured data from machines equipped with based on RTK GPS measurements (which is high precision). The haul road portion 422, however shows a much rougher surface due to because was generated based on relatively few data measured points and those measured points were derived from machines equipped with low precision GPS. DEM 400 also depicts terrain for isolated areas 430, 432 of the worksite that are separated from the main portion of the worksite depicted by the DEM, which includes the middle portion 420 and haul road 422. These isolated areas 430, 432 are shown as being separated from the main portion because no terrain data values were recorded intermediate the isolated areas 430, 432 and the main portion. Outside of the main portion, the worksite machines only transit measured surface position data when they are in these isolated areas 430, 432.

In addition to the elevation values, other information is stored for each grid location of the terrain model raster. Specifically, the determined error for each predicted, measured or otherwise determined elevation value is also stored for each grid location. If the elevation value at the grid location is spatial data corresponding to a measured position, the source identifier and time data corresponding to the measured position are also stored for each grid location. Thus, various different 3-D rasters can be extracted from the same terrain dataset and visually displayed or analysed. For example, in addition to extracting the elevation values to display the DEM, the processing system 202 is configured to extract the error values for each grid location, and display on the display device a 3-D visualisation of the elevation error for each grid location. Thus a 3-D visualisation of the DEM error is displayed.

Figure 5:
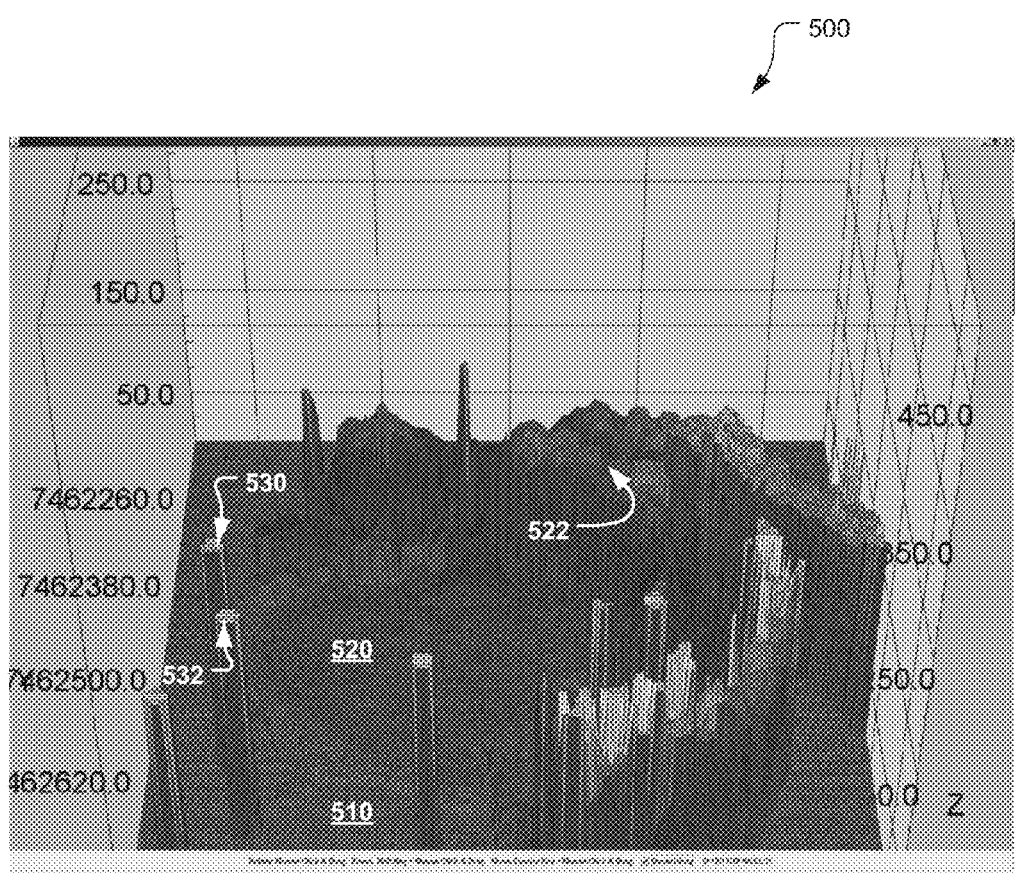
FIG. 5 is a visualisation of an error model aspect of the worksite terrain model, for the digital elevation model of FIG. 4.

An exemplary visualisation of an error model 500 corresponding to the DEM 400 is illustrated in FIG. 5, showing the uncertainties in the elevation at each grid position of the DEM. The visualisation illustrated in FIG. 5 maps variance in meters squared (variance being the standard error, G, squared) with respect the x,y plane 510, the x,y plane 510 of the error model being the same as the x,y plane 410 of the DEM. The middle portion 520, corresponding to middle portion 420 of the DEM, shows that the variance or standard error orders of magnitude smaller than at haul road portion 522 (corresponding to haul road portion 422 of the DEM). Isolated areas 530 and 532, corresponding to isolated areas 430 and 432 of the DEM, are also shown as having relatively high error, although not all isolated areas of the DEM 400 have a high corresponding error.

As can be seen from the above description and FIGS. 4 and 5, the terrain dataset represents a unified terrain model including both predicted surface positions of the worksite, based on time data and spatial data for measured positions on the surface of the worksite, and including corresponding errors for each predicted positions.

Communication of Terrain Data to Worksite Machines

During worksite operations terrain model data is communicated, at step 316, to various worksite machines to assist those machines in traversing the worksite and carrying out their assigned tasks. For example, many machines (particularly heavy vehicles) will have a start-up sequence which involves the machine obtaining the terrain model (dataset) for use over the course of their assignments.

In addition to the initial provision of the terrain dataset to worksite machines, the computer processing system 202 of the control centre 160 (and the computer processing systems 230 of the worksite machines) are, in some embodiments, configured to communicate/receive updated terrain data dynamically over the course of worksite operations.

In this context, communication of terrain data from the control centre 160 to a given worksite machine involves the computer processing system 202 of the control centre 160 communicating the terrain data to the computer processing system 230 of that machine over the communications network 220. In one embodiment, as well as communicating terrain data to worksite machines the computer processing system 202 of the control centre 160 maintains a record of the terrain dataset that was last communicated to each of the worksite machines.

In one case, terrain data is communicated from the control centre 160 to a given worksite machine according to a set schedule, which can, for example, be every minute, every half-hour, every hour or every shift-change. Different worksite machines (or different types of worksite machines) may operate on different schedules. However, for many machines, the need for "current" data generally necessitates regular updating and transmission of the terrain model, or at least the relevant subset(s) of the terrain model (e.g. where productivity machines are active). For such regular updating, new subsets will generally be communicated to the respective worksite machines at intervals of less than five minutes, or in some cases less than three minutes, e.g. every minute or two.

Alternatively, or in addition, the control centre 160 may be configured to communicate terrain model data to one or more worksite machines on occurrence of a particular event. For example, if the control centre 160 determines or is notified that a significant change has occurred to the worksite terrain since the terrain dataset was previously communicated to a machine, the control centre 160 may automatically push the updated terrain data to the worksite machine(s). Such a change may be some event on the mine, for example, a shift change, completion of blasting, opening or closing of a dump or load area, or a loader coming back into operation following a delay.

Control centre 160 may also receive terrain data requests from worksite machines and respond to such requests by communicating terrain model data that includes predicted data for the current time. Such requests may be manually made by the operator of a machine or automatically made by the computer processing system 230 of the machine. For example, some machines may store and operate on a partial terrain model (i.e. a terrain dataset that only provides information on part of the terrain of the worksite). In this case, the machine's computer processing system 230 is configured to calculate when the machine is nearing terrain for which it does not have data. This calculation may be based on the current position of the machine (obtained, for example, from GPS sensors) and the extents of the terrain data stored. When the processing system 230 determines that the machine is within a set distance from the extents of the available terrain data (e.g. 200 m, 500 m, 1 km) a request is sent to the control centre for further terrain data.

In many cases, when terrain data is to be communicated to a given worksite machine that machine will not require the entire terrain dataset. For example, a levelling machine 106 operating in a particular location 140 for an extended period of time will have no immediate need for terrain information pertaining to other areas of the worksite (e.g. loading location 130, dumping location 132, roads 138). Similarly, a haulage machine traversing roads 138 between a loading location 130 and dumping location 132 has no immediate need for terrain data regarding development location 140.

In such cases, communicating the entire terrain model dataset to a given machine may not be necessary, and doing so may unnecessarily consume resources (e.g. control centre processing bandwidth in preparing and sending the entire terrain dataset, communications bandwidth in transmitting the entire terrain dataset, and machine processing bandwidth in receiving and processing the entire terrain dataset).

Accordingly, in some embodiments, when communicating terrain data to a worksite machine the computer processing system 202 of the control centre 160 is configured to communicate only a subset of the entire terrain dataset that is determined to be relevant.

More specifically, processing system 202 determines positions of a surface of the worksite based on measurements relating to the worksite's terrain using a method already described herein. At least some of the measurements are received from a plurality mobile machines on the worksite. Other measurements used to determine the positions may be received from flying machines, such as a flying drone 114 or a satellite. The determined positions are used to generate a terrain dataset that defines a terrain model. Accordingly, some or all of the determined positions may be predicted positions based on a plurality of measured positions, as has been described herein. The processing system 202 then transmits a first subset of the determined positions to various mobile machines on the worksite, depending on their position and/or assigned or executed task, and/or some event relevant to the machine. Processing system 202 may also transmit determined errors corresponding to the first subset of the determined positions to the first mobile machine.

The relevant subset of the terrain dataset may be determined in a variety of ways. For example, based on GPS sensor information the control centre may know the current position of a given machine and communicate a subset of the terrain dataset based on that position. E.g. the control centre 160 may communicate terrain data representing the terrain within a set radius of the machine's current location (e.g. within 200 m).

Alternatively, or in addition, the control centre 160 may determine a relevant subset of the terrain dataset for a given worksite machine according to where changes to the terrain have occurred. For example, where only a sub-area of the terrain has changed compared to the terrain data currently being used by a machine (determined by the control centre 160 using the reference of what terrain data each machine currently holds), the control centre may communicate only data relating to those areas of the terrain that have changed (or sufficiently changed) compared the machine's current terrain data instead of communicating the entire terrain dataset to the machine.

Further alternatively, the control centre 160 may determine the relevant subset of terrain data based on the current/upcoming assignment of a given worksite machine. For example, the control centre 160 knows that a given haulage machine 102 is assigned to haul material from loading location 130 to dump location 132. Control centre 160 also knows/calculates that in order to do so the haulage machine 102 needs to traverse particular roads 138. With this information the control centre 160 can determine the relevant subset of the terrain dataset to be the data pertaining to the haulage machine's likely path.

Determining Terrain Models using Different Sources of Sensor Data

In the above exemplary process 300, the spatial data was derived at step 304 based on a determined position, and determined position and orientation, of a mobile machine on the worksite. Such algorithms can be applied to sensor data in which the sensor or sensors provide information regarding the position of the sensor (e.g. a two GPS sensors, or PS sensor and an orientation sensor/INS).

However, for a given point of terrain at a given time or time window, the computer processing system 202 has access to information from multiple sensor systems (of the same and/or different types). For example, at a given point in time or time window, a particular point of terrain may have been:

- traversed by one or more ground vehicles (e.g. haulage machines 102, loading machines 104, levelling machines 106, light vehicles 108, ground drones 114), each having a machine positioning system, such as a GPS system other machine positioning system described herein;
- monitored by one or more camera systems (e.g. stationary or vehicle mounted), each of which having recorded image data in relation to the point of terrain;
- scanned by one or more Lidar and systems (e.g. stationary or vehicle mounted), each of which having recorded Lidar data in relation to the point of terrain;
- scanned by one or more Radar and systems (e.g. stationary or vehicle mounted), each of which having recorded Radar data in relation to the point of terrain;
- modified by one or more vehicles (e.g. a loading machine 104 or levelling machine 106), each of which may identify a location at which the terrain has been modified.

Additionally, processing system 202 can access a model of the mine that has been derived by a manual survey of the worksite by surveying professionals, using known surveying techniques.

Thus, in step 304 other sensor systems can be used to determine the spatial data of measured positions on the worksite. Exemplary methods will now be described for such sensor systems.

Determining Spatial Data Based on a Lidar or Radar Sensor System

Since Lidar and radar systems are based on time-of-flight measurements to light/radar-reflective surfaces, they may also be used to determine the terrain information for the worksite 100. Specifically, the time-of-flight information is used to measure distances from the Lidar/radar system to the respective reflective positions on the surface of the worksite 100. The Lidar/radar sensor data received by processing system 202 also includes orientation information for each reflected signal, so a 3-dimensional vector from the Lidar/radar system, for each reflected signal, can be determined. Processing system 202 also determines the position and orientation of the Lidar/radar sensor, determined from GPS and orientation information received from the mobile machine, and known fixed positional relationship between the GPS sensor and the Lidar/radar system.

The processing system determines the positions on the surface of the worksite (i.e. the spatial data), with respect to a fixed 3-dimensional coordinate system by transposing the 3-dimensional vectors of the reflected Lidar/radar signals to a fixed coordinate system, based on the determined position of the Lidar/sensor.

Such spatial data be determined from any mobile machine described herein, included land-based machines and air-based mobile machines (e.g. a flying drone), however, the land based machines will generally produce more spatial data than the air-based machines. Therefore, in particularly advantageous embodiments, the Lidar/radar sensor data is received from a land-based mobile machine.

Determining Spatial Data based on a Camera Sensor System

Camera systems can be used to measure positions on the worksite surface by measuring the distance from the camera to points on a surface of the worksite as captured in an image of the worksite or part thereof, e.g. by using a time-of-flight camera or a stereo photogrammetry technique known in the art. Such images can be particularly useful in determining surface elevation information when captured from an aerial view, e.g. by a drone or drones flying over the worksite site. The worksite machine, e.g. the drone 114, which has the camera system also includes a machine positioning system, e.g. a GPS to identify the position of the camera system with respect to a fixed 3-dimensional coordinate system. The positions on the surface of the worksite can thereafter be determined by transposing the determined distances from the camera to the worksite surface to the fixed coordinate system.

Figure 6:
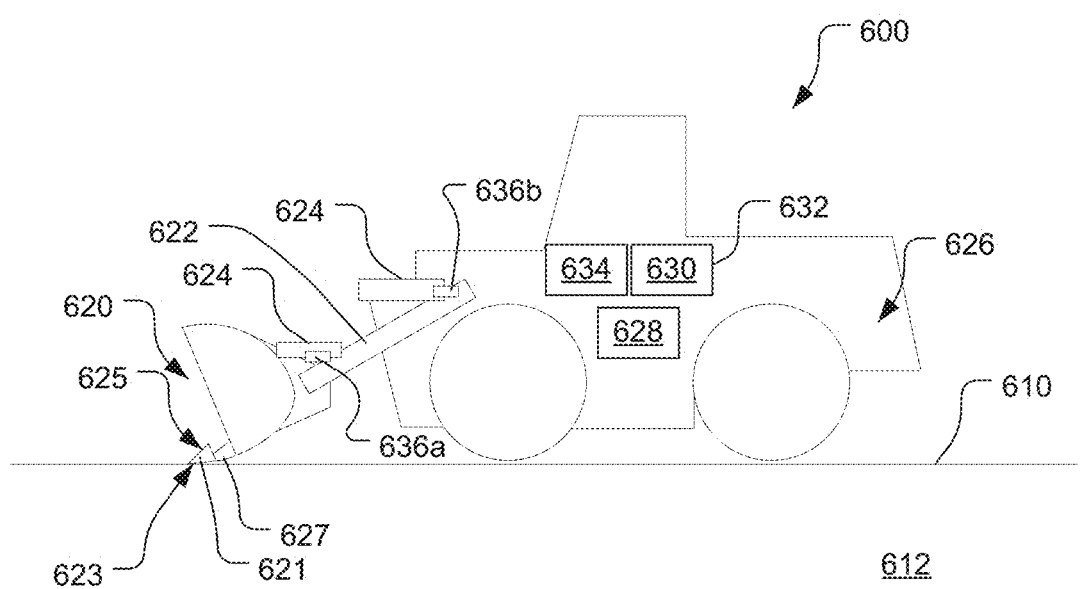
FIG. 6 is a block diagram of a worksite machine having an earth moving implement.

Determining Spatial Data based on a Position Associated with an Earth Moving Implement Positions on a worksite surface may also be determined based on information concerning an earth moving implement on a worksite machine. FIG. 6 illustrates a block diagram of an exemplary worksite machine 600 on a surface 610 of worksite 612. In the illustration of FIG. 6, the worksite machine is a wheel loader, but in other examples any other worksite machine having an earth moving implement may be used. In the case of the wheel loader 600 of FIG. 6, the earth moving implement 620 is a bucket, the position of which is controlled by boom 622 and hydraulic system 624 for moving the boom 622 in relation to the main body 626 of the worksite machine 600, and for moving the earth moving implement 620 in relating to the boom 622.

The earth moving implement 620 has a ground engaging portion 621 designed to engage the surface 610 of the worksite to move ground at position 623 on the worksite. The ground engaging portion is provided by ground engaging tools 625, in this case a plurality of teeth 625 mounting along a front edge of the base 627 of the implement 620.

On board the main body 626 is a computer processing system 628 having all of the features of the computer processing system 230. The computer processing system 628 is in communication with a machine positioning system 630 which includes an RTK GPS system and is fixed to a known mounting location 632 on the main body 628. The processing system 628 is also in communication with a sensor 634 for measuring a parameter that is indicative of force upon the earth moving implement 620. Additionally, the processing system 628 is in communication with an articulation sensor system 636(*a*,*b*) comprised or articulation sensors 636*a* and 636*b* for measuring the respective pivot angles between (i) the earth moving implement 620 and boom 622 and (ii) boom 622 and the main body 626.

Using the information from the articulation sensor system 636 the pose of earth moving implement 620 can be determined with respect to a main body 622. Further, based on the shape and size of the machine 600 and the articulation angle(s) of its articulated body or bodies (i.e. boom 622 and earth moving implement 620), the position and orientation of the earth moving implement 620 with respect to the main body 626 can be determined by trigonometric calculations. Since the pose of the main body is known from the machine positioning system 630, a position associated with the earth moving implement 620, in relation to the worksite 612, may be determined.

For example, the determined position may be the position of a ground engaging portion 621 of the implement 620, which in this case is the position of a digging end of ground engaging tool 625 on the bucket 620.

For a grading machine, on the other hand, the position of the ground-engaging portion may be assumed to be positions along a ground-engaging edge, or at a GET, of the machine's blade implement.

Techniques are well established for using articulation information to the determination of positions of the ground engaging portion when it engages with the ground. However, for completeness, an exemplary method will now be described.

The position and orientation of the mobile machine is determined by processing system 202 using any method known in the art or described herein, using positioning system 630. The processing system 202 also determines the pose of the implement or position of a ground engaging portion thereon, with respect to the a fixed coordinate system by determining pose of the implement 620 with respect to the positioning system 630 and references the bucket 620 with respect to the determined position of the mobile machine 600. The shape and size of the implement 620 is also known from knowledge of the type of mobile machine associated with the articulation sensor. Based on such data, the position of the portion 621 of the implement 620 designed to engaged the ground of worksite 612 is determined.

the processing system 230 of the worksite machine identifies when the implement 620 engages with the ground based on the forces affecting the implement 620. An indication of the force on the implement is sensed by sensor 624, for example, a current sensor that senses electrical current load to the hydraulics that moves the implement, or a pressure transducer in the hydraulics. For machines in which the earth moving implement is not operated by hydraulics, other sensor systems may be used, e.g. a strain gauge, to indicate force on the implement. Based on a rate of change and/or magnitude of the indication of force, processing system 230 concludes that the earth-moving implement 620 has come into contact with an obstruction, i.e. the ground of the worksite 612.

The processing system 230 thereby determines articulation values (and the position of the ground engaging portion 621 of the implement 620 that corresponding to such articulation values) at which the implement 620 has engaged with the ground. The processing system 230 also determines the times at which such engagement occurred, based on the time at which the indication of force represents a ground engagement event. The articulation values and/or the positions of the ground engaging portion, and the corresponding times of ground engagement are then sent processing unit 204 of control centre 160 for further processing. If the processing unit 204 receives only the articulation values and ground engagement times, it can calculate the corresponding positions of the ground engagement portion 621 by factoring in the known worksite machine type and the machine's pose at the relevant ground engagement time.

In any case, the processing unit 204 has data that identifies measured positions, associated with the earth moving implement 620, at which the earth moving implement 620 was engaged with the terrain of worksite 612. As has described above, the determination of such positions may be based on any known method.

Once the positions associated with the earth moving implement 620 have been determined, processing unit 204 generates spatial data that defines measured positions of a surface of the worksite. This is achieved recognising that a position of the ground engagement portion 621 of the implement, when the implement engages the ground, is indicative of the worksite terrain having had a surface 610 at that position. Based on this relationship, the processing unit 204 generates spatial data that defines position coordinates of a position 623 of the worksite surface 610 that match the measured coordinates of the ground engaging portion 621 of the implement 620 when it engaged the terrain. The processing unit 204 then stores this spatial data defining position 623 to memory.

Determining Time Data Corresponding to the Spatial Data

In cases where the time spatial data is determined from a plurality of different sources, such as GPS sensor and another sensor (e.g. lidar, radar, camera or articulation sensor), the time data associated with each sensor type may potentially be different. Since the terrain of the worksite may be changing with time, if the difference in time data is substantial, the calculated spatial data of the measured position on the worksite may be incorrect. Specifically, when a surface position measured by a sensor system (e.g. an articulation sensor system) on a mobile machine is transposed to a fixed coordinate system based on the measured position of the machine (e.g. by a GPS system), the sensor data from the two systems that is used to calculate the measured surface position needs to correspond to respective times that are within a predefined time difference, so that the transposition to the fixed coordinate system is accurate. In other words, the position of the machine when it measured a given surface position needs to be essentially the same as the determined position of the GPS of the machine when it recorded the measurement.

To achieve this, when performing such transpositions, processing system 202 is configured to compare the times of different sensor data and only combine sensor data if the difference in the time data is within a predefined maximum (e.g. 30 milliseconds).

By keeping the time difference within the defined maximum, the Additionally, the processing system 202 averages the different values of time data used from the different sources to determine a time data value corresponding to the spatial data.

The position coordinates of the each measured position defined by spatial data, determined by the transposition, are saved to non-transient memory 212, along with time data value corresponding to the spatial data, a source identifier identifying the sources associated with the sensor data. Where two time values are associated with the spatial data, e.g. the articulation sensor timestamp and the GPS timestamp, either one of the timestamp values may be saved as the time data of the measured spatial position, or the timestamp values may be averaged to determine the time data of the measured spatial position.

The precision of spatial data may also be determined and stored by combining the precisions of the respective sensor types used to determine each position defined by spatial data, using standard error summing techniques (i.e. for each determined position, a combined precision is determined, based on the precision of the GPS-based position and the precision of the lidar/radar/articulation sensor-based position with respect to the GPS).

Data Fusion

In some embodiments, all values for the error weighting factor $e_i$ may be the same for all elevation value measurements. For example, this would be the case if all spatial data is derived from the same source, i.e. the same sensor system type(s) on the same mobile machine. Alternatively, if multiple machines of the same type are involved in the same activity, then spatial data derived from the same sensor system type(s) on the same type of mobile machine. In such embodiments, the error weighting factor will be cancelled out of the weighted average. Thus $e_i$ is a constant, so the weighting function is dependent on time and distance, but need not be dependent on the precision of the surface measurements (as indicated by step 306 in FIG. 3).

However, in the present disclosure, spatial data defining measured surface positions that are derived from different sources can be combined, with different weightings being applied to different spatial data, depending on the source of the spatial data. This enables the prediction of current positions of the surface of the mine worksite to utilise spatial data derived from the wide variety of sources, of different types (as has been described herein), that collect data on the worksite, as opposed to merely disregarding older measurements in favour newer measurements as they become available. Indeed, the terrain model from which the DEM and error model images of FIGS. 4 and 5 were respectively extracted, was generated by fusing 1 month's measured data from 3 wheel-loaders and 20 haulage trucks.

By combining the information from the multiple sources the error in the predicted surface positions can be reduced. Further some sensor system types do not measure surface position with enough accuracy to build a reliable terrain model from their data alone, but their data is combined with other data, the reliability of the terrain model can be improved to within acceptable limits. However, there are challenges in combining spatial data corresponding to surface positions measured by different sources because the reliability of the respective measurements may be different. This can be especially problematic since the reliability of a given measurement can change with time.

Figure 7:
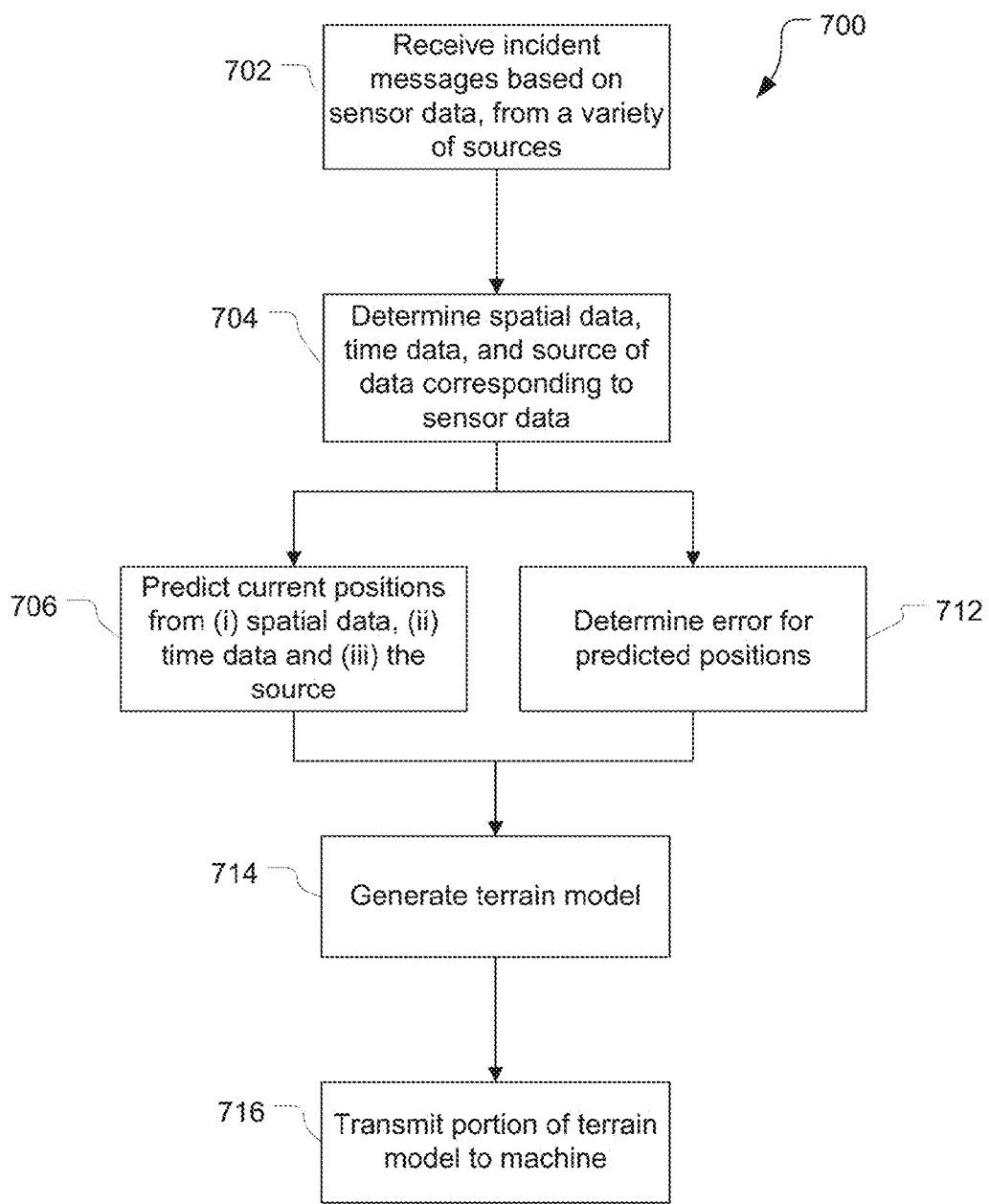
FIG. 7 is a flow diagram illustrating data processing stages in accordance with another embodiment of the present disclosure.

In the present disclosure spatial data defining measured surface positions, based on measurements performed at different times and by different sources, can be combined to predict a current surface position. This can be achieved in a variety of ways. An exemplary process for achieving this is depicted is process 700 depicted in FIG. 7. Process 700 involves similar steps as process 300, but in process 700 the computer processing system 202 of control centre 160 receives incident messages, at step 702, from a variety of different sources, with each of the incident messages identifying the source of the sensor data in the incident message.

The processing system 202 determines, at step 704, the spatial data that identifies the measured worksite surface positions corresponding to the sensor data. Since the relationship between the sensor data and spatial data is dependent on the type of source, the processing system 202 determines different sets of spatial data from the sensor data, with the different sets of spatial data respectively corresponding to the a different source, or a different combination of sources, used to derive the spatial data. For example, one set of spatial data may have been derived from articulated sensor and GPS data from a wheel loader, while the another set of spatial data may have been derived from GPS and Lidar information from a haul truck.

Since the relationship of the sensor data and the position on the surface defined by the spatial data is dependent on the type(s) of source used to determine each measured position, the processing system selects an algorithm to calculate each measured position, whereby the algorithm is selected based on the source identifier.

The determined position coordinates of the each measured position defined by spatial data are saved to non-transient memory 212, along with the time data corresponding to the spatial data, the source identifier for the spatial data, and the precision data for the spatial data, using methods that have already been described herein.

At step 706, processing system 202 predicts current positions of the worksite surface based on the spatial data, the time data corresponding to the spatial data, the source identifier corresponding to the spatial data, and in some embodiments, the precision or accuracy of the spatial data.

In one exemplary embodiment, a single weighting function, such as that exemplified above, may be applied to all spatial data, but with the error weighting factor being dependent on the source. The error weighting factor for each source may be dependent on the precision of the measurement from the source, as described above, or may be dependent on some other parameter. The error weighting factor can, for example, be determined from a look up table stored in non-transient memory 212, which identifies predetermined error weighting factors based on a source identifier associated with the source data and/or the sensor data.

In some situations, however, the different source identifiers will be correlated with different characteristic changes on the worksite at the measured position. For example, if spatial data for a measured position is derived from positions where an excavation bucket was determined to have modified the worksite terrain, it is likely that the terrain around that location is rapidly changing to the area terrain proximate the measured position is also likely to be affected by digging passes in the near future. Further, excavating material by a bucket may affect an area larger than the area of the bucket due to slippage of terrain. Knowledge of the type of bucket (which can be determined by knowing the type of machine) can also be used to predict the extent of change with increasing time and increasing distance from the measured position.

Additionally or alternatively, activity information about a certain position may be based on other information, such as a known mining activity plan for the worksite 100. For example, the terrain of the worksite around a measured positions can be inferred to be changing if productivity machines involved in loading or dumping are active at or near the measured position. The rate of change of the terrain at the position with respect to time and distance from that position can be predicted from the activity information.

Since different machines are involved in different types of activities and have different features (e.g. bucket sizes, rates of excavation), their expected impact on the terrain will vary depending on the machine type. For example measured positions derived from levelling machine 106 will be associated with different characteristic changes to measured positions derived from loading machine 104, and different again for different types of loading machines.

Thus in one embodiment, the weighting function is tailored according the source identifier. This can be achieved by using the following weighting function:

$$w_i(x,t,e,s)=(a_s+b_s/((\delta x_i+c_s)(\delta t_i+d_s)^2))e_{i,s}$$

wherein s is the source identifier and any one or more of $a_s$, $b_s$, $c_s$, $d_s$ and $e_{i,s}$, are configured to vary depending on the source identifier.

The values for $a_s$, $b_s$, $c_s$, $d_s$ and $e_{i,s}$, are predetermined by measuring, for each source type, the variation in measured positions with distance and time. The variation can be considered for example by determining a variogram as a function of distance, and a variogram as a function of time, for a given source of measured positions. The values of a, b, c, d and e, for that measurement source can selected so that distance and time differences are weighted to have increasing weights for distance and time differences that have lower semivariance. Additionally, distance and time differences that correspond to a semivariance greater than a threshold can be rejected.

For spatial data derived from for wheel loader, it has been determined that examples of suitable values for these parameters are: a=1, b=10,000, c=2, d=0.0001, and e=1. These constants were derived for a Caterpillar® 994G wheel loader equipped with two RTK GPS receivers and an articulation sensor for the boom of the wheel loader, to determine positions of bucket engagement with the ground. As the behaviour of different loaders (in terms of their impact on terrain) will be more or less the same, these constants may be used for all loaders. However, if any specific type of loader behaves in a markedly different manner, then the parameters can be tailored to suit that loader type.

To account for any differences in characteristics associated with different classes of worksite machines (e.g. haulage machines, shovels, loading machines, drills, grading machines and light vehicles), different constants (i.e. parameters a, b, c and d) may be used for one or more the different classes, or each class of machine may have a unique set of parameter values. For example, each class of earth moving equipment/machine will potentially have its own specific parameterization because of the type of motion (e.g. circular or linear motion) and speed with which it moves and the way it engages the ground (e.g. digging or grading). On the other hand, non-earthmoving land-based equipment, such as light vehicles 108 or land-based drones 114, will generally have similar characteristics because they do not change the surface of the ground and all move in similar fashions with similar speeds. For each class of worksite machine an appropriate set of parameters for that class may be determined based on the empirically derived data corresponding to mining operations specific that class of machine.

In one embodiment of step 706, the source identifier is used by processing system 202 to select entirely different inverse weighting functions depending on the source. By knowing the type of machine and/or sensor type that defined by source identifier, the computer processing system 202 can determine from a look-up table what activity or activity state was likely to occurring at the corresponding measured position when the sensor data for that measured position was determined.

As in method 300, the prediction in method 700 uses interpolation by inversely weighting distances and weighing time, with the time weighting in some case also be weighted according to an inverse weighting relationship (more precisely an inverse-square relationship). However, in the case of different entirely different weighting functions for different source identifiers, the processing system 202 selects a weighting function for each spatial data used in the prediction, wherein the selected weighted function is selected by a lookup table that associates each spatial data source identifier with a corresponding weighing function identifier that defines which weighting function to use for that spatial data. Thus, as alternative or in addition to fitting different parameterization values to different classes of machines, different weighting functions may be used for different classes or machines. This is appropriate where selection of parameters a, b, c and d does not provide enough flexibility to accurately model all classes of machines. In some cases, each class of machine has its own unique weighting function. For example, for some of the source identifiers the selected weighting function may be used:

$$w_{i,1}(x,t,e,s)=(a_s+b_s/((\delta x_i+c_s)(\delta t_i+d_s)^2))e_{i,s}$$

For other source identifiers, the selected weighting function may be:

$$w_{i,2}(x,t,e,s)=(a_s+b_s/((\delta x_i+c_s)(\delta t_i+d_s)))e_{i,s}$$

Since $w_{i,2}$ has an inverse relationship with time, as opposed to $w_{i,1}$ which has an inverse-square relationship with time, $w_{i,2}$ can be used for machines associated with terrain that less dramatically changes with time.

Upon selecting each weighting function, the elevation value corresponding to each measured position is weighted in accordance the given weighting function, with processing system determining the weighted average for elevations values at locations within a predefined vicinity of the location being interpolated.

At step 712, the error for each predicted position is determined. The error may be calculated as the weighted RMS value or other weighting of the errors corresponding to the respective measured positions, as has been previously described herein. However, in the case of predicting data based on measured positions from different types of sources, the weighting function used to weight errors corresponding to each measured position can vary depending on the source of the measured position (i.e. depending on the sensor systems(s) contributing the measured position and/or worksite machine associated sensor system(s).

At step 714, processing system 202 generates a terrain model from the predicted current positions of the worksite surface and the respective errors determined for each surface position in the model, using the same process as step 314 of process 300.

At step 716, processing system 202 transmits portions of the terrain model to mobile machines on the worksite using the process as step 316 of FIG. 3.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A method of determining a mine worksite's terrain, the method comprising:
sensing sensor data related to the worksite's terrain from a plurality of worksite machines on or around the worksite;
communicating the sensor data along with metadata to a control center, wherein the metadata includes at least time data and a source identifier;

generating spatial data that defines measured positions of a surface of the worksite based on the sensor data and the metadata;

predicting a current position of the surface of the worksite based on the measured positions and corresponding time data;

estimating an error corresponding to each predicted current position;

generating a terrain model that maps the predicted current positions and the corresponding estimated errors; and transmitting and displaying a three-dimensional visualization of the terrain model to at least one worksite machine.

2. A method according to claim 1, wherein the estimated error being dependent on the source identifier from which the position was determined.

3. A method according to claim 2, wherein each worksite machine being associated with at least one of source identifier.

4. A method according to claim 2, wherein the estimated error is a weighted RMS of the errors corresponding to each predicted current position.

5. A method according to claim 1, wherein the sensor data from each worksite machine includes a corresponding standard error and estimating the corresponding error for the predicted current position includes weighting the standard error corresponding to each measured position from the plurality of worksite machines.

6. A method according to claim 5, wherein where each worksite machine has a unique weighting function.

7. A method according to claim 5, wherein the standard error from more than one sensor system on a worksite machine is combined.

8. A method according to claim 1, wherein each predicted current position is weighted according to a distance between the measured position and predicted current position and an elapsed time based on an age of predicted current position from the measured position.

9. A method according to claim 8, wherein each estimated error corresponding to a predicted current position is weighted depending on an age associated with the measured position.

10. A method according to claim 9, wherein each estimated error corresponding to a measured position is weighted according to a weighting function that has:
a negative first partial derivative with respect to the age; and
a negative first partial derivative with respect to the distance.

11. A method according to claim 8, wherein weighting each predicted current position according to a weighting function that has:
a negative first partial derivative with respect to the age of the measured position; and
a negative first partial derivative with respect to the distance between the measured position and predicted current position.

12. A method according to claim 8, wherein a semivariance of each distance and age is determined and compared to a threshold.

13. The method according to claim 1, wherein the terrain model includes a Digital Elevation Model (DEM) that maps the predicted current positions and an error model that maps the estimated errors corresponding for each predicted current position, the DEM and the error model being mapped to a common reference plane.

14. A system for determining a mine worksite's terrain, the system comprising:
at least one processing device; and
at least one memory for storing instructions to be executed by the at least one processing device;
wherein, upon executing the instructions, the at least one processing device is configured to;
sense sensor data from sensor systems related to the worksite's terrain from a plurality of worksite machines on or around the worksite;
communicate the sensor data along with metadata to a control center over a communication interface, wherein the metadata includes at least time data and a source identifier;
generate spatial data that defines measured positions of a surface of the worksite based on the sensor data and the metadata;
predict the current position of the surface of the worksite based on the measured positions and corresponding time data;
estimate an error corresponding to each predicted current position;
generate a terrain model that maps the predicted current positions and the corresponding estimated errors; and
transmit and display a three-dimensional visualization of the terrain model to at least one worksite machine.

15. A system according to claim 14, wherein the estimated error being dependent on the source identifier from which the position was determined.

16. A method of determining a mine worksite's terrain, the method comprising:
sensing positional sensor data and time data related to the worksite's terrain from a plurality of worksite machines on or around the worksite, wherein each worksite machine is associated with a unique source identifier;
generating spatial data that defines measured positions of a surface of the worksite based on the positional sensor data and time data from a plurality of unique identifiers;
predicting current positions of the surface of the worksite based on the measured positions and the time data;
estimating an error corresponding to the predicted current positions, wherein the error is weighted based on a distance between the measured position and the predicted current position and based on an elapsed time between the predicted current position and the measured position;
generating a terrain model that maps the predicted current positions and the corresponding estimated errors; and
controlling at least one of the worksite machines autonomously based on the terrain model.

* * * * *